(12) United States Patent
Brenner et al.

(10) Patent No.: US 7,494,092 B2
(45) Date of Patent: Feb. 24, 2009

(54) LIGHTWEIGHT STRUCTURAL COMPONENT IN PARTICULAR FOR AIRCRAFT AND METHOD FOR ITS PRODUCTION

(75) Inventors: Berndt Brenner, Dresden (DE); Bernd Winderlich, Dresden (DE); Jens Standfuβ, Pirna (DE); Jörg Schumacher, Kirchlinteln (DE); Hartmut Brenneis, Düdenbüttel (DE); Walter Zink, Bremen (DE)

(73) Assignees: Fraunhofer-Gesellschaft zur Förderung der angewandten Forschung e.V., München (DE); Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 10/757,419

(22) Filed: Jan. 15, 2004

(65) Prior Publication Data
US 2005/0077427 A1   Apr. 14, 2005

(30) Foreign Application Priority Data
Jan. 16, 2003   (DE) ................... 103 01 445

(51) Int. Cl.
*B64C 1/06* (2006.01)
(52) U.S. Cl. .................................... 244/119
(58) Field of Classification Search ............... 244/119, 244/120, 123, 124, 117 R, 131, 132; 248/346.4; 52/630
See application file for complete search history.

(56) References Cited

U.S. PATENT DOCUMENTS

| | | | | |
|---|---|---|---|---|
| 4,113,910 A | * | 9/1978 | Loyd ......................... | 428/162 |
| 4,219,980 A | * | 9/1980 | Loyd ......................... | 52/309.1 |
| 4,256,790 A | * | 3/1981 | Lackman et al. ............... | 428/73 |
| 4,909,655 A | * | 3/1990 | Anderson .................... | 403/267 |
| 5,501,414 A | * | 3/1996 | Bauer ......................... | 244/124 |
| 6,173,925 B1 | * | 1/2001 | Mueller et al. ............... | 244/219 |
| 6,364,250 B1 | | 4/2002 | Brinck et al. | |
| 6,543,721 B2 | * | 4/2003 | Palm ....................... | 244/117 R |
| 6,595,467 B2 | | 7/2003 | Schmidt | |
| 2001/0038057 A1 | | 11/2001 | Palm | |

FOREIGN PATENT DOCUMENTS

| | | |
|---|---|---|
| DE | 19844035 | 11/1999 |
| DE | 19924909 | 6/2000 |
| DE | 10031510 | 1/2002 |

OTHER PUBLICATIONS

Publication by P. Heider, *Lasergerechte Konstruktion und Lasergerchte Fertigungsmittel zum Schweiβen groβformatiger Aluminium-Strukturbauteile*, VDI-Fortschrittsberichte, series 2, Fertigungstechnik, No. 326, VDI-Verlag Düsseldorf (1994).

* cited by examiner

*Primary Examiner*—Tien Dinh
(74) *Attorney, Agent, or Firm*—Greenblum & Bernstein, P.L.C.

(57) ABSTRACT

Lightweight structural component including at least one panel and at least one stiffening element oriented one of lengthwise and crosswise. The at least one stiffening element includes two side pieces. Each of the two side pieces is at least partially connected to the panel in a material-locking manner. The two side pieces are connected to the panel at two separate joint zones. A method of producing the lightweight structural component includes milling the at least one panel to form at least one thickened region and joining the two side pieces to the at least one panel at the two separate joint zones. This Abstract is not intended to define the invention disclosed in the specification, nor intended to limit the scope of the invention in any way.

6 Claims, 14 Drawing Sheets

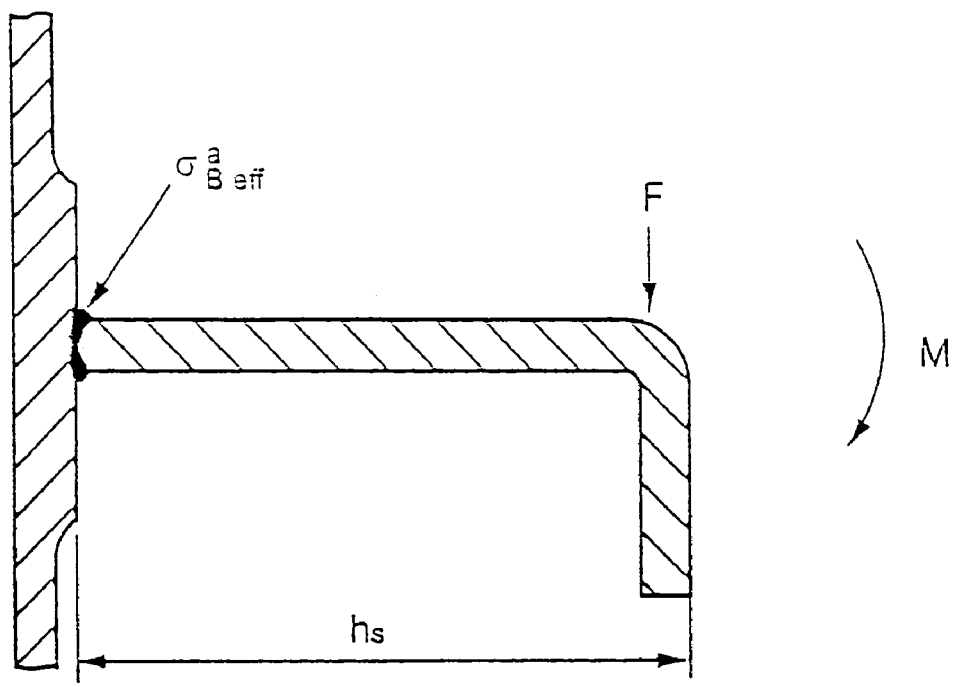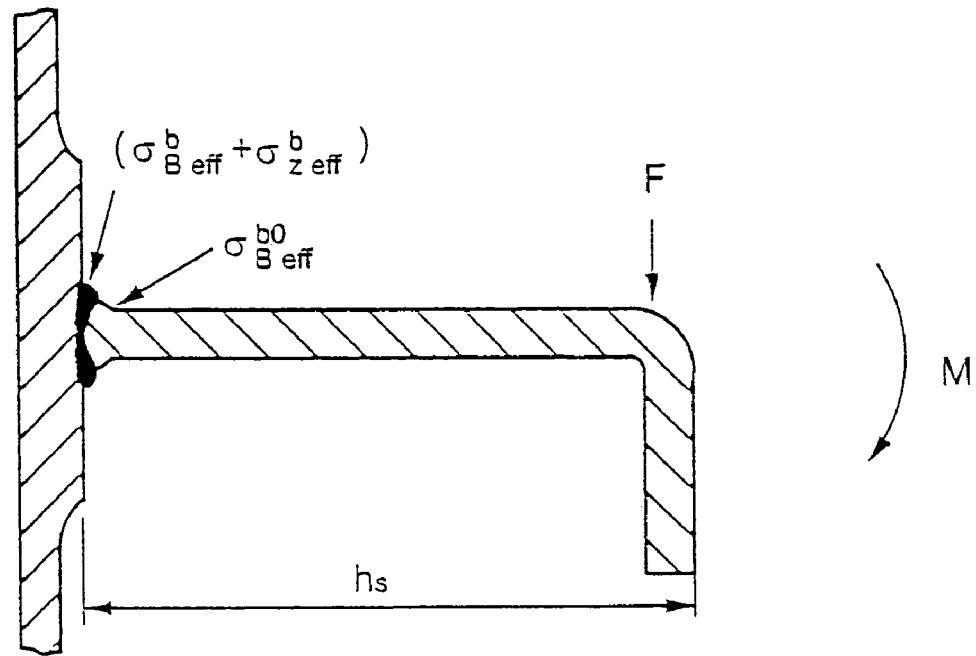

LIGHTWEIGHT STRUCTURAL COMPONENT IN PARTICULAR FOR AIRCRAFT AND METHOD FOR ITS PRODUCTION

CROSS-REFERENCE TO RELATED APPLICATIONS

The present application claims priority under 35 U.S.C. §119 of German Patent Application No. 103 01 445.4, filed on Jan. 16, 2003, the disclosure of which is expressly incorporated by reference herein in its entirety.

BACKGROUND OF THE INVENTION

1. Field of the Invention

The invention relates to the design and production of lightweight structural components. Objects in which its application is expedient and possible are all large-volume lightweight structures in which an essential part of the bearing pressure occurs as area load via skin sheets and which are provided with stiffening elements for load distribution, load diversion, reduction of deflection or prevention of denting or buckling. Typically such cases of stressing are particularly marked in many lightweight structures that are acted on by a pressure difference between the outside and the inside of the skin sheet in addition to the structural load. The invention can be used particularly advantageously for aircraft structures, in particular for fuselage structures, but also for wing structures, engine intakes, pressure bulkheads, landing gear shaft covers, etc. Other fields of application lie in liquid tanks or gas tanks, pressure tanks or vacuum tanks, components of rockets and rocket engines and fuselage structures of lightweight watercraft.

2. Discussion of Background Information

Without restricting the generality, the prior art and the background of the invention will be explained by way of example based on the construction of aircraft fuselage structures. Usually aircraft fuselages are produced from riveted panels that are reinforced by riveted stiffening elements— respectively stringers running lengthwise along the fuselage pipes and ribs running in the circumferential direction. Typically a stringer comprises a suitably formed stringer head, a stringer bar and a stringer base resting on a panel base at an angle of 90° relative to the stringer bar, which stringer base is riveted to the panel base.

The stress on the panel/stiffening element structure is very complex due to the different load originations and the static and cyclical loads dependent on many parameters. In the design of aircraft fuselages constructed in such a way, preset static strength demands must be met, fatigue strengths taken into account and safety guaranteed with regard to different preset critical failure scenarios. In the embodiment of the aircraft fuselage as a riveted structure, these demands are taken into account through the location-dependent and loading-dependent selection of the thickness of panel, stringers, ribs, the shape and the spacing of stringers or ribs, the dimensions of panel base and rivets and rivet spacing, etc. The fact that weight-saving potentials in terms of construction methods have been largely exhausted and that the production of this type of differential structure is too expensive because of the limited riveting speed and, in addition, can hardly be improved on in qualitative terms, have a negative impact on the design of the conventionally riveted structure.

It is known, for example, from P. Heider: *Lasergerechte Konstruktion und lasergerechte Fertigungsmittel zum Schweißen großformatiger Aluminium-Strukturbauteile* in: VDI-Fortschrittsberichte, series 2: Fertigungstechnik, no. 326, VDI-Verlag Düsseldorf (1994) to replace riveting by welding the stringer foot to the panel base from both sides simultaneously by means of two lasers. In order to realize this connection with a sufficiently well-developed root of the weld seam and in a manner low in pores, it is necessary for both laser beams to produce a common melting bath. This is achieved in that the two laser beams, placed opposite one another, are focused on identical positions with respect to the joint. Hot cracks are thereby avoided, through the use of suitable wire-shaped weld fillers, such as, e.g., wire of the alloy AlSi12. Through the very low linear energy of the process and the energy input symmetrical to the stringer, the deformation is limited.

In another embodiment of this principle the construction of completely welded shell components is possible, including stringers, ribs, clips, distribution belts and rib heads. See, for example, P. Brinck et al.: *Schalenbauteil für ein Flugzeug und Verfahren zur Herstellung*, PS DE 198 44 035 C1.

Despite better static strength and higher rigidity compared with a riveted connection, the disadvantage of a connection produced in this way lies in its lower damage tolerance which is manifested by, e.g., a higher rate of crack growth of a circumferential crack after crossing the stringer and a lower residual strength. The reason for this is that, on reaching a welded-on stiffening element, a crack spreads out into the latter. Whereas with a conventional differential construction, the crack growth in the fuselage planking is delayed through the riveted or adhered reinforcements, such as stringers or ribs, since the crack tip does not spread into the stiffening elements for a certain number of load cycles and, moreover, is held together through the intact reinforcement, in the welded-on stiffening elements the crack grows in the planking and the stiffening element simultaneously, without a noticeable crack-delaying effect occurring. The weight-saving use of laser beam-welded fuselage shells is thus only possible for fuselage regions for which the design criteria for damage tolerance do not need to be met, i.e., only for the lower shells of the fuselage.

The reason for this defect or disadvantage is that the known integral embodiments of the connection of the stiffening elements does not provide any adequate geometric, stress-related or microstructural possibilities for stopping a crack, a less damaging crack branching or an energy dissipation near the crack opening. The crack can thus spread unhindered into the stiffening elements.

Another defect or disadvantage is that the direct tensile strength of a stringer/panel connection laser beam-welded from both sides simultaneously decreases with increasing weld seam depth, i.e., with increasing stringer thickness.

The reason for this is, i.a., to produce greater weld seam depths the weld parameters have to be changed such that a greater linear energy and more unfavorable ratios of wire conveying speed of the weld filler to welding speed have to be selected. Together with solid state mechanical influences, both of these lead to a greater under-matching in the welding zone, a broader overaged region in the heat affected zone and to an increased risk of formation of micro-hot cracks.

To improve the crack growth behavior of shell components with welded-on stiffening elements, it has become known from, for example, F. Palm: *Metallisches Schalenbauteil*, PS DE 199 24 909 C1 to increase the thickness of the bar of the stiffening element near the welding zone without increasing the connection depth of the laser beam weld seam made from both sides simultaneously. In other embodiments of the invention a reduced weld seam depth is made or notches placed between the weld seam and the increased thickness.

The object of all three measures is to make it more difficult for a crack to spread in the direction of the stringer head. The crack can possibly be deflected and can run for a certain distance in the weld seam or along the weld seam.

The disadvantage of this solution is that this embodiment is only geared to the two bay crack type of stress, i.e., the bearing of a longitudinal or circumferential crack over two rib sections or stringer divisions. Both for the "tension in the direction of the head of the stiffening element" type of stress, such as occurs in the lower fuselage region and for ribs, and for the combined "bending with bending deflection crosswise to the stiffening element" and "tension in the direction of the head of the stiffening element" types of stress, as occurs in the areas of the fuselage loaded by transverse stress, the proposed solution leads to a reduction of the bearable loads or to a premature stringer or rib rupture.

The reason for the defect is that the two disadvantages of an integrally welded structure—the lack of an effective mechanism for delaying cracks and the locally increased crack growth rate in the weld seam—are combated only with disadvantageous consequences regarding loading capacity for other types of stress, or cannot be combated at all.

An embodiment of a welded arrangement of panel and reinforcing elements that achieves an increase in residual strength and thus is also intended to render possible the use of welded fuselage shells for the side and upper shell area of the fuselage is known from H. J. Schmidt (PS DE 100 31 510 A1). To this end reinforcements are applied to the stiffening elements before the laser beam-welding. The reinforcements can thereby be arranged as doubler plates or as tension bands.

The doubler plates comprise high-strength Al alloys or fiber-reinforced metal laminates and are attached by riveting or an adhesive bond. The doubler plates must thereby be an adequate distance from the weld seam, which distance is determined by the temperature field of the welding process. The tension bands comprise high-strength steel alloys or titanium alloys or fiber composites and are inserted and twisted into through bores that are to be made beforehand. Cross section reinforcements are provided in the lower bar area of the stiffening element to contain the through bores. Another variant provides embodying the lower bar area in a slotted manner, inserting the tension band through a mounting opening in the slotted lower bar area and connecting the inserted tension band to the tension band in a form-locking manner by compressing the slotted bar area and subsequently connecting it to the skin sheet by laser beam welding in a known manner.

An increase in residual strength is achieved through the crack-delaying effect of the reinforcements. This occurs in that the number of the load cycles necessary for the complete severance of the stiffening element is increased and the reinforcing element does not fail until after the stiffening element. Through the latter effect the reinforcing element can reduce the crack opening angle and reduce the tensions at the crack tip for the period between the failure of the stiffening element and the failure of the reinforcing element.

The embodiment of the weld seam itself is not changed with respect to the previously known prior art. This means that the stringer or rib foot is attached to the skin sheet across its entire width by a single weld seam, whereby the weld seam is produced by laser beam welding from both sides simultaneously.

One defect of the arrangement is that it is not suitable for improving the prior art with regard to the two critical stress types "tension in the direction of the head of the stiffening element" and "bending in the direction crosswise to the stiffening element." The danger of static failure as a result of the separation of the stiffening element from the panel, in particular during transverse stress in the side shells, therefore remains.

The reason for this is-that the unchanged weld seam arrangement and weld seam vicinity cannot bear any greater direct tensile stress or bending stress crosswise to the longitudinal directions of the stiffening elements.

Moreover, it has a disadvantageous effect that the reinforcements of the stiffening elements do not reduce the local crack growth rate in the weld seam and its direct vicinity. This applies in particular to stress types such as, e.g., transverse stress in which there is a danger of a crack spreading along the weld seam.

The reason for this is that, for reasons determined by the process and the arrangement, they have to be installed at a distance from the weld seam at which their effect in terms of stress relief for the weld seam is very slight.

Another defect is that the reinforcing elements cannot be applied to or inserted in the stiffening elements in an economic manner.

The reason for this is that additional production steps, such as, e.g., riveting the doubler plates, adhering the doubler plates or drilling very long through bores are necessary to apply the reinforcements, which steps are in themselves very expensive or in part even more expensive than the riveting of the stiffening elements to the panel which is to be replaced.

Furthermore, the fact that the variant with inserted tension bands is not suitable for ribs has a disadvantageous effect. The reason for this lies in the impossibility of drilling a curved slot or of bending together the two side pieces of the slotted lower bar area after inserting the tension band in a plastic manner without damage to the materials or a permanent deformation of the entire stiffening element.

SUMMARY OF THE INVENTION

The invention is directed to a new kind of lightweight structural component in particular for aircraft and a method for its effective and lower-cost production that is also suitable for complex stress types. It is applicable for both straight and curved stiffening elements, features an improved damage tolerance, direct tensile strength, transverse stress loading capacity and bending resistance, and can be used even with thicker stiffening elements. Moreover, it does not require expensive additional separate production steps.

The invention is also directed to a lightweight structural component that, despite integral embodiment, features a differential failure behavior, that leads to reduced load stresses and strains in the joint zone and its immediate vicinity and that can be produced simply with modern manufacturing methods.

The invention also takes account of the following:
The embodiments of integral lightweight structures, and here in particular aircraft fuselage structures, known according to the prior art, do not adequately exploit the possibilities of jointing technology due to a constructional design not suitable for welding;
It is also possible to execute integral structures with locally effective elements that avoid the weld seam weak point and produce a differential failure scenario; and
A sufficiently faultless welding is possible even without a laser beam-welding from both sides simultaneously with a common melting bath, if new laser beam sources with the highest beam quality and suitable, process-adapted beam formation (twin spot or elliptical beam) and suitable weld fillers are used.

According to one aspect of the invention, in contrast to all previous solutions known according to the prior art, the bar of the stiffening element on its side facing the skin sheet comprises not one foot but two spatially separate side pieces, both of which are connected to the panel in a material-locking manner by way of two separate joint zones. This arrangement has the advantages that with the same weight a clearly stiffer arrangement is realized which, compared with the previous solution, reduces the mechanical stress due to direct tension and bending in the weld seams, reacts in a less sensitive manner to welding defects and is much less demanding in terms of the requirements of precision control of the two laser beams relative to one another.

For higher stresses, such as those that normally prevail, e.g., in aircraft construction, the panel is embodied so that it features a thickening in the region of the junction points of the joint zones.

The stiffening elements can be embodied as stringers or as ribs in the embodiment of the structural component according to the invention.

The inventive concept is not limited to the joint zone necessarily being a laser weld seam. The joint zones can just as well comprise friction stir welded zones or adhered zones.

Through a local thickening of the skin sheet—here embodied as a skin stiffening base—the crack growth rate in the "circumferential crack with broken stringer" stress type can be clearly reduced while crossing the stringer. Through the supporting effect of the locally thickened skin sheet in particular the loading of the weld seam is reduced and the crack growth rate in the first side piece is reduced. Moreover, the now divided crack tip has to travel greater distances on several paths until the second stringer side piece and the entire stringer bar and stringer head are severed.

The invention also provides for an advantageous design of the geometric dimensions of the stiffening element and skin sheet arrangement.

The invention can also prove useful for all types of stress environments in which the stiffening elements can be arranged outside. In this case the weld seam is not stressed by radial tensile forces. Through the branching of the crack after it crosses the weld seam, the crack growth rate is locally reduced compared with the prior art.

The inventive concept does not relate only to the heads of the stiffening elements being embodied in the classic L-shape. Without violation of the inventive concept, the stiffening profile can also be embodied, e.g., as a U-profile or as a profile similar to a U-profile. In this form, the head side of the U-profile can be connected particularly well to potentially necessary attachment parts. Embodiments disclosed herein further develop the geometric shape of the stiffening element for this case.

The invention also introduces a new additional variant for improving damage tolerance. They provide the arrangement of cut-outs within the side pieces of the stiffening element. If a running crack runs into one of these openings, it can be stopped. The reason for this is that the very high stress intensity factor at the crack tip is replaced by the lower notched form factor of the cut-out after the crack leads into the cut-out. In fact, this is equivalent to the necessity of a new start of the crack in a stress field with a lower stress concentration.

It is known from experiments that once a primary crack has formed under the stress conditions of the two bay crack criterion, it is very hard to deflect it from its general crack growth direction. It can therefore happen that with a conventional embodiment of the stringer, the crack runs between the two cut-outs and is even accelerated for a short time due to the locally lower supporting effect. This is taken into account by the staggered arrangement of the cut-outs in the two side pieces. For the lower fuselage region these cut-outs can advantageously be used as drainage openings at the same time.

The fact that the load stresses are not distributed homogenously in an aircraft fuselage is allowed for in an advantageous manner. Thus in particularly highly stressed areas the crack growth rate in the stringer foot can be further reduced through the local application of a doubler plate made of a damage-tolerant, fiber-reinforced laminate. In particular in the case that the stiffening element is a rib, the reduction of the structural static load capacity can be compensated for by the cut-outs during tensile stress on the rib-bar.

The invention also permits a new approach to reducing the load stress in the joint zones. In the region of the upper shells of the fuselage, the joint zones are subjected to a high tensile stress that can be clearly reduced by stress relief elements arranged in their direct vicinity.

Disclosed embodiments also advantageously utilize the finding that material accumulations can reduce the crack growth in the panel in a particularly effective manner if they are located in the direct vicinity of the panel. They contribute less to avoiding buckling because of their lower moment of resistance, but they are sufficient to be able to somewhat enlarge the spacing of the stiffening elements and thus to save weight generally. Moreover, they are able to improve the acoustic behavior of the fuselage.

The invention also provides that if heads are arranged asymmetrically to the longitudinal axis of the stiffening elements, the stiffening elements deform crosswise to their longitudinal direction under tensile stress, compressive stress or transverse stress and thus generate high bending stresses in the weld seam.

The invention also provides an arrangement for a lightweight structural component in which a reinforcing element is located in the cavity that is formed by the two side pieces of the stiffening element and the skin sheet, which reinforcing element comprises a material with a much higher modulus of elasticity than the skin sheet and the stiffening elements and which is connected to at least one of the partners stiffening element or skin sheet in a form-locking and/or force-locking manner. During an elongation of the panel in the direction of the longitudinal axis of the stiffening elements, the force-locking and/or form-locking connection between the reinforcing element and the stiffening element or the skin sheet reduces the elongation in the foot area of the stiffening element and thus in the joint zones. Thus stress on the two weld seams is relieved such that despite a microstructure in the weld zone that promotes the crack growth, a locally reduced crack growth rate results. Since the fatigue strength of the reinforcing elements that have not begun to crack is much greater than the crack-spreading stress in the skin sheet and stiffening element, the reinforcing element still remains intact even when the crack has crossed both side pieces of the stiffening elements and the panel stiffening base. In addition to a reduction of the crack growth rate, the residual strength is also increased. In comparison with the prior art it has a positive impact in that the reinforcing element is located in the direct vicinity of the weld seam and thus can effectively reduce the stress concentration during the approach of the crack to the joint location between the panel and stiffening element. Thus the arrangement of the reinforcing elements according to the invention is suitable for avoiding or reducing the disadvantages of an integral structure with respect to damage tolerance.

The invention also provides process steps for producing the lightweight structural component according to the invention.

Embodiments relate to the use of laser beam welding as the most favorable process variant. In one embodiment the experience is utilized that the development of welding defects (pores, discharge) can be reduced with laser beam welding of aluminum by a suitable beam formation.

The inventive concept further contemplates the joining to take place by friction stir welding or adhesion.

The invention also provides a process that saves cycle time by way of joining from both sides simultaneously. However, in contrast to previous assumptions it is also possible to produce sufficiently faultless weld seams with weld seams welded unilaterally in succession and located separately from one another. The fact that it is thus possible to omit the simultaneous welding on both sides while forming a common melting bath renders possible the constructional free spaces for the embodiment according to the invention of the lightweight structural component as well as a simplified process cycle.

The invention also provides for methods with which the stiffening elements according to the invention can be mechanically produced in a non-cutting manner in a particularly favorable way. According to one embodiment extrusion is used as a very cost-effective method of producing the stiffening elements including their bars. If the stiffening element is embodied as a rib, this results in the difficulty that in the case of, e.g., an aircraft fuselage, it has to be embodied in a curved manner. Such curved semi-finished products can also be produced in a very favorable manner, if during extrusion a transverse force is exerted on the semi-finished product immediately after the extrusion die. If the height of the stiffening element is too great in relation to its thickness, it is more favorable to produce the two side pieces by splitting by way of pressure rollers.

One process step is the production of the force-locking and/or form-locking connection between the stiffening element and/or skin sheet with the reinforcing element. The invention also provides for favorable variants for this.

The invention also provides for a lightweight structural component in particular for aircraft comprising at least one skin sheet and stiffening elements arranged lengthwise or crosswise or lengthwise and crosswise thereon, which stiffening elements are connected completely or at least partially to the skin sheet respectively by their foot in a material-locking manner, wherein the bar of the stiffening element on its side facing the skin sheet is composed of two side pieces that are both connected to the panel in a material-locking manner by way of two separate joint zones.

The panel may feature a thickening in the region of the connection points of the joint zones. The stiffening elements may be embodied as stringers running lengthwise. The stiffening elements may be embodied as ribs running in the circumferential direction. The separate joint zones may be laser beam weld zones. The separate joint zones may be friction stir weld zones. The separate joint zones may be adhered joint zones.

A panel stiffening base may be located between the inner surfaces of the side pieces, the thickness of which panel stiffening base $d_{Hv}$ is greater than the thickness $d_{Hs}$ of the panel base and whose side surfaces are designed such that they rest on the inner surfaces of the side pieces and the two joint zones are embodied such that they extend up to the side surfaces of the panel stiffening base. The two side pieces may be bent by a total angle $\alpha$ so that the inner surfaces of the two side pieces and the surface of the skin stiffening base form an isosceles triangle and the total angle $\alpha$ lies in the range $7° \leq \alpha \leq 50°$. The following ratios apply for the dimensions of the stiffening element: the ratio between the side piece thickness in the plane of the joint zone $t_s$ and the thickness of the stiffening element $d_s$ is $0.5 \leq t_s/d_s \leq 1.8$; the ratio between side piece length $s_s$ and the height of the stiffening element $h_s$ is $0.15 \leq s_s/h_s \leq 0.7$; the ratio of the side piece thickness near the branching of the two side pieces of the stiffening element $b_{sO}$ and the side piece thickness in the plane of the joint zone $t_s$ is $0.28 \leq b_{sO}/t_s \leq 1$; the angle $\beta$ between the panel and the joint surface of the joint zone is $0° \leq \beta \leq 25°$.

The two side pieces may be bent at a total angle $\alpha=180°$ so that the inner surfaces of the two side pieces rest on the surface of the panel base. The stiffening element may be formed from a generally U-profile, whereby the two side pieces extend directly up to the head of the stiffening element. The head of the stiffening element may extend on both sides over the side pieces of the U-profile which run parallel. The two areas of the head of the stiffening element extending over the side pieces may each feature an edge area pointing in the direction of the skin sheet. The panel reinforcing base may be embodied in a divided manner and that the two lateral outer surfaces of the panel reinforcing base rest on the inner surfaces of the side pieces. The two joint surfaces and the outer sides of the panel stiffening base or feature a surface may be produced by metal cutting.

Cut-outs may be located in the two side pieces, which cut-outs are arranged at intervals a along the side pieces. The distance between the edging of the cut-outs and the joint surfaces may be greater than one and a half times the side piece thickness $t_s$ in the plane of the joint zone. The cut-outs may be arranged displaced respectively by the distance a/2. The cut-outs may feature a cylindrical form. The cut-outs may feature the form of equal-sided or virtually equal-sided triangles with rounded off corners, whereby the cut-outs are arranged along the side pieces so that the vertices of the triangles point alternately in the direction of the panel and in the direction of the head of the stiffening element.

A doubler plate may be made of a damage-tolerant, fiber-reinforced laminate is attached on both outer surfaces of the two side pieces of the stiffening element. One to five stress relief elements may be located inside the panel base symmetrical to the bar of the stiffening element and near the joint zones, which stress relief elements comprise a material with a much higher modulus of elasticity and higher fatigue strength than the material of the skin sheet. The stress relief elements may be made of high-strength wire cables. One stress relief element may be located directly beneath the panel stiffening base. The panel stiffening base may be made of the material expediently deformed during the rolling-in of the stress relief element. The panel bars may be located on the panel parallel or perpendicular or perpendicular and parallel to the reinforcing elements. The height of the panel bars may correspond to the height of the panel stiffening base and the spacing of the stiffening elements on the skin base may be an integral multiple of the spacing of the panel bars. The head of the stiffening element may be embodied symmetrically and may be arranged centrally on the bar of the stiffening element.

The invention also provides for a lightweight structural component in particular for aircraft, comprising at least one skin sheet and stiffening elements arranged thereon lengthwise or crosswise or lengthwise and crosswise. The stiffening elements are connected completely or at least partially to the skin sheet respectively by their foot in a material-locking manner. Each bar of the stiffening elements on its side facing the skin sheet is made of two side pieces, both of which are connected in a material-locking manner to the panel by way of two separate joint zones. The panel features a thickening in the region of the connection points of the joint zones. A reinforcing element is located in the cavity formed by the two side pieces and the panel stiffening base, which reinforcing element comprises a high-strength material with a modulus of elasticity that is greater than the modulus of elasticity of the materials of the skin sheet or of the stiffening elements. The reinforcing element is connected to the two side pieces and/or the panel stiffening base in a force-locking and or form-locking manner.

The stiffening elements may be embodied as stringers running lengthwise. The stiffening elements may be embodied as ribs running in the circumferential direction. The separate joint zones may be laser beam weld zones. The separate joint zones may be friction stir weld zones. The separate joint zones may be adhered joint zones.

The two joint surfaces and the outer sides of the panel stiffening base may feature a machined surface.

A combined force-lock and form-lock may be realized in that the surface of the reinforcing element features a roughening or a surface profiling, the impression of which is on the two inner surfaces of the two side pieces and/or the surface of the panel reinforcing base.

The cavity formed by the two side pieces and the panel stiffening base, and the cross section of the reinforcing element, may form an equal isosceles triangle with a rounded-off apex.

The reinforcing element may be embodied as a wire or a pipe, the panel stiffening base is embodied as a circle segment with the wire or pipe diameter, and the branching of the two side pieces at the foot of the stiffening element is embodied such that it encloses the wire or the pipe at a looping angle of approx 180° and the two side pieces lie parallel to one another, whereby the spacing of their two inner surfaces corresponds to the diameter of the wire or pipe.

The panel stiffening base may contain a recess to accept the reinforcing element. The bar or the side pieces of the stiffening element may feature cut-outs that are arranged along the-bar or along the side pieces at intervals "a". The cut-outs may be embodied in a circular manner. The cut-outs may feature the shape of equilateral or almost equilateral triangles with rounded-off corners, whereby the triangles are arranged along the bar or the two side pieces such that one apex of the triangles points alternately in the direction of the panel and in the direction of the head of the stiffening element. The cut-outs may be arranged and/or displaced by the distance a/2 respectively.

Two or four stress relief elements may be located inside the panel base symmetrical to the bar of the stiffening element and near the joint zones, which stress relief elements are composed of a material with a much higher modulus of elasticity and higher fatigue strength than the material of the skin sheet. The stress relief elements may be composed of high-strength wire cables.

Panel bars may be located on the panel parallel or perpendicular or parallel and perpendicular to the reinforcing elements. The height of the panel bars may correspond to the height of the panel stiffening bases and the spacing of the stiffening elements on the skin sheet is an integral multiple of the spacing c of the panel bars. The head of the stiffening element may be embodied symmetrically and may be arranged centrally on the bar of the stiffening element.

The invention also provides for a method for producing a lightweight structural component, in particular for aircraft, as described above, and made by the following stages: chemical or mechanical milling to make the thickening of the skin sheet; extrusion of the stiffening elements, tensioning of the panel; symmetrical positioning of the stiffening element on the thickening of the skin sheet; tensioning of the stiffening element to realize a flat configuration of the joint surfaces; and joining of the stiffening element to the skin sheet by way of two separate joint zones with at least local mechanical tension.

The joining may be carried out by way of laser beam welding. The laser beam focus may be formed such that it is extended in the feed direction or divided into two partial beams.

The joining may be carried out by way of friction stir welding. The joining may be carried out by adhesion. The Joining of the two side pieces or of the stiffening element to the skin sheet may be carried out from both sides simultaneously.

The two side pieces of the stiffening element may be joined to the skin sheet unilaterally in succession. The two side pieces may be embodied with the aid of and during extrusion. The stiffening element may be a rib, the rib is extruded with such a radius that the radius that is featured by the two undersides of the side pieces corresponds to the radius of the inside of the panel base. The stiffening element may be conventionally extruded and the two side pieces may be produced by a subsequent splitting by way of press rollers.

Before the positioning of the stiffening element on the skin sheet, the reinforcing element may be inserted between the side pieces of the stiffening element or in the recess of the panel stiffening base and is connected to the stiffening element or the panel stiffening base in a form-locking and/or force-locking manner by way of a mechanical deformation. The mechanical deformation may be carried out by rolling-in. The force-locking and/or form-locking connection between the stiffening element and the reinforcing element may be produced by coextrusion. The mechanical deformation to produce the force-locking and/or form-locking connection between the stiffening element and reinforcing element may be effected by tensioning technology directly before the joining process or in the course of the joining process.

The invention also provides for a lightweight structural component comprising at least one panel, at least one stiffening element oriented one of lengthwise and crosswise, the at least one stiffening element comprising two side pieces, and each of the two side pieces being at least partially connected to the panel in a material-locking manner, wherein the two side pieces are connected to the panel at two separate joint zones.

The component may be utilized in an aircraft. The at least one panel may comprise a skin sheet. The at least one panel may comprise a thickened region in an area of the two separate joint zones. The at least one stiffening element may comprise a stringer which is oriented in a lengthwise manner. The at least one stiffening element may comprise a rib running in a circumferential direction. The two separate joint zones may comprise laser beam weld zones. The two separate joint zones may comprise friction stir weld zones. The two separate joint zones may comprise adhered to joint zones. The two separate joint zones may comprise adhesive bonded joint zones. The at least one panel may comprise a panel stiffening base having an outer portion and an inner portion arranged between inner surfaces of the two side pieces.

The panel stiffening base may comprise a thickness $d_{Hv}$ of the inner portion is greater than a thickness $d_{Hs}$ of the outer portion and wherein side surfaces of the inner portion rest against inner surfaces of the two side pieces. The two separate joint zones may respectively extend at least partially up to the side surfaces of the inner portion. The two side pieces may be bent away from each other by a total angle α, whereby inner surfaces of the two side pieces and a surface of the at least one panel form a generally isosceles triangle. The angle α may lie in a range of between approximately 7° and approximately 50°.

The at least one stiffening element may comprise the following: a ratio between a side piece thickness $t_s$ in a plane of each joint zone and a thickness $d_s$ of the at least one stiffening element comprises approximately $0.5 \leq t_s/d_s \leq$ approximately 1.8; a ratio between each side piece length $s_s$ and a height $h_s$ of the at least one stiffening element comprises approximately $0.15 \leq s_s/h_s \leq$ approximately 0.7; and an angle β between the panel and each joint surface of each joint zone comprises approximately $0° \leq β \leq$ approximately 25°.

The at least one stiffening element further comprises the following: a ratio of each side piece thickness $b_{s0}$ near a branching of the two side pieces and a side piece thickness $t_s$ in a plane of each joint zone comprises approximately $0.28 \leq b_{s0}/t_s \leq$ approximately 1.

The two side pieces may be bent or oriented at a total angle a of approximately 180°, whereby inner surfaces of the two side pieces rest on a surface of at least one panel. The two side pieces may be integrally formed with the at least one stiffening element, whereby the at least one stiffening element and the two side pieces comprise a one-piece member. The two side pieces may be integrally formed with the at least one stiffening element, whereby the at least one stiffening element and the two side pieces comprise a one-piece member. The at least one stiffening element may comprise a generally U-shaped profile, whereby the two side pieces are arranged on opposite ends of a head of the at least one stiffening element. The two side pieces may be of the generally U-shaped profile and may be parallel to each other. The at least one stiffening element may comprise an edge area which is oriented in a generally parallel manner relative to the at least one panel. The at least one panel may comprise a panel reinforcing base portion which comprises a first base portion and a second base portion separated from the first base portion, wherein lateral outer surfaces of the first and second base portions rest against inner surfaces of the two side pieces.

An area of the at least one panel may comprise the two joint zones wherein each joint zone comprises surfaces formed by metal cutting. An area of the at least one panel may comprise the two joint zones which each comprise surfaces formed by metal removal. At least one of the two side pieces may comprise cut-outs. At least one of the two side pieces may comprise a plurality of through openings. Each of the two side pieces may comprise cut-outs and the cut-outs may be arranged at generally regular intervals "a". Each of the two side pieces may comprise through openings arranged at generally regular intervals "a". A distance between an edge of the through openings and joint surfaces of the two joint zones may be greater than approximately one and a half times a side piece thickness $t_s$ measured in a plane of each joint zone. The through openings in one of the two side pieces may be spaced from each other by a distance "a" and wherein the through opening of the other of the two side pieces are spaced from the through opening of the one of the two side pieces by a distance of approximately a/2. The through openings may comprise circular openings. The through openings may comprise polygonal openings. The through openings may comprise non-circular openings. The through openings may comprise triangular openings. The triangular openings may comprise approximately equal-sided triangular openings with rounded corners, whereby vertices of adjacent triangular openings point in opposite directions.

The component may further comprise a doubler plate made of a damage-tolerant fiber-reinforced laminate attached on outer surfaces of each of the two side pieces.

The component may further comprise at least one stress relief element located inside the at least one panel. The at least one panel may comprise a thickened panel base arranged in an area of the two separate joint zones and the at least one stress relief element may be arranged within the thickened panel base. The at least one stress relief element may be arranged directly beneath a bar portion of the at least one stiffening element and between the two separate joint zones. The at least one stress relief element may comprise a material with a higher modulus of elasticity and a higher fatigue strength than a material of the at least one panel. The at least one stress relief element may comprise a plurality of stress relief elements. The at least one stress relief element may comprise a plurality of spaced apart stress relief elements. The at least one stress relief element may comprise a high-strength wire cable. The at least one stress relief element may be located directly beneath a panel stiffening base of the at least one panel and is centrally disposed between the two separate joint zones. The panel stiffening base may be integrally formed with the at least one panel, whereby the panel stiffening base and the at least one panel comprise a one-piece member.

The at least one panel may comprise a panel stiffening base made of material that is deformed during a rolling-in of a stress relief element into the panel. The at least one panel may comprise a panel stiffening base made of material that is deformed during a rolling of the panel. The at least one panel may comprise a plurality of panel bars arranged generally parallel to one another and perpendicular to the at least one stiffening element. The at least one panel may comprise a plurality of panel bars arranged generally parallel to one another and generally perpendicular to the at least one stiffening element. The at least one panel may comprise a plurality of panel bars, some of which are arranged generally parallel to one another and some of which are arranged generally perpendicular to one another. The at least one panel may comprise a plurality of panel stiffening bases and a plurality of panel bars, wherein a height of the panel bars corresponds to a height of the panel stiffening bases, wherein the at least one stiffening element comprises a plurality of stiffening elements, and wherein a spacing between the stiffening elements is generally equal to an integral multiple of a spacing "C" between the panel bars. The at least one stiffening element may comprise a head portion that is coupled to a bar portion. The head portion may project from both sides of the bar portion. The head portion may project by generally equal amounts from both sides of the bar portion.

The invention also provides for a lightweight structural component comprising at least one panel comprising at least one thickened region, at least one stiffening element arranged on the at least one panel in at least one of a lengthwise and a crosswise direction, the at least one stiffening element comprising a bar portion and two side pieces, each of the two side pieces being at least partially connected in a material-locking manner to the at least one thickened region by two separate joint zones.

Each of the two side pieces may instead be non-removably and/or fixedly secured to the at least one thickened region by two separate joint zones. The, component may further comprise a reinforcing element located in a cavity formed by the two side pieces and a surface of the thickened region. The at least one thickened region may comprise a panel stiffening base and the reinforcing element may comprise a high-strength material having a modulus of elasticity that is generally greater than a modulus of elasticity of a material of at least one of the at least one panel and the at least one stiffening element.

The reinforcing element may be connected to at least one of the two side pieces and the at least one panel stiffening base in one of a force-locking manner and a form-locking manner. The component may be arranged on an aircraft. The at least one stiffening element may comprise a stringer running in a lengthwise direction. The at least one stiffening element may comprise a rib running in a circumferential direction. The two separate joint zones may comprise laser beam weld zones. The two separate joint zones may comprise friction stir weld zones. The two separate joint zones may comprise adhered or adhesion joint zones. The two separate joint zones may comprise adhesive bonded joint zones. The two joint zones may comprise panel surfaces and surfaces of the two side pieces, and wherein each of the panel and two side piece surfaces comprises a machined surface.

The reinforcing element may comprise surfaces which are both force-locked and form-locked to at least one of inner surfaces of the two side pieces and a surface of the thickened region. The surfaces may comprise one of a rough profile and surface profiling. The reinforcing element may comprise surfaces which are fixed to at least one of inner surfaces of the two side pieces and a surface of the thickened region.

The component may further comprise a cavity formed by the two side pieces and the thickened region and a reinforcing element arranged within the cavity. The cross-sectional shape of the cavity may generally correspond to the cross-sectional shaped of the reinforcing element. The cavity may comprise a cross-sectional shape having a form of a generally equal isosceles triangle with a rounded-off apex. The reinforcing element may comprise a cross-sectional shape having a form of a generally equal isosceles triangle with a rounded-off apex.

The component may further comprise at least one reinforcing element arranged within the thickened region. The component may further comprise at least one reinforcing element arranged between the two side pieces, wherein the at least one reinforcing element comprises one of a wire, a wire rope, a pipe and a tube. The at least one thickened region comprises a curved surface and wherein the two side pieces comprises curved surfaces, whereby the curved surfaces enclose the at least one reinforcing element. The two side pieces may contact at least approximately 180° and/or half of the outer surface of the at least one reinforcing element. The two side pieces may comprise portions which are arranged parallel to one another, whereby a spacing between inner surfaces of the two side pieces generally corresponds to a diameter of the at least one reinforcing element. The at least one thickened region may comprise a panel stiffening base which contains a recess adapted to receive a reinforcing element.

The component may further comprise a plurality of cut-outs arranged in at least one of the bar portion and the two side pieces, wherein the cut-outs are arranged at regular intervals "a".

The component may further comprise a plurality of through openings arranged in at least one of the bar portion and the two side pieces, wherein the through openings are arranged at regular intervals "a". The component may further comprise a plurality of through openings arranged in at least one of the bar portion and the two side pieces. The through openings may comprise a circular through openings. The through openings may comprise non-circular through openings. The through openings may comprise polygonal through openings. The through openings may comprise generally approximately equilateral triangular through openings with rounded-off corners. Adjacent triangular through openings may be oriented in opposite directions. The through openings of one of the two side pieces may be arranged offset from the through openings of another of the two side pieces, whereby a distance between the through openings of each of the two side pieces comprises a value "a", and whereby a distance between each of the through openings of one of the two side pieces and each of the through openings of another of the two side pieces comprises a/2.

The component may further comprise a plurality of stress relief elements arranged within the thickened region. At least one of the plurality of stress relief elements may be arranged on one side of the bar portion and at least another of the plurality of stress relief elements may be arranged on another side of the bar portion. At least one of the plurality of stress relief elements may be arranged near each of the two separate joint zones. At least one of the plurality of stress relief elements may comprise a material having a higher modulus of elasticity and a higher fatigue strength than a material of the at least one panel. At least one of the stress relief elements may comprise a high-strength wire cable. The at least one panel may comprise a sheet skin for one of an aircraft, a boat and a ship. The at least one panel may comprise a plurality of panel bars. The plurality of panel bars may be arranged generally parallel to the at least one stiffening element. The plurality of panel bars may be arranged generally perpendicular to the at least one stiffening element. The plurality of panel bars may be arranged generally parallel and generally perpendicular to the at least one stiffening element. A height of the panel bars may correspond to a height of the thickened region. The at least one stiffening element may comprise a plurality of stiffening elements which are spaced apart from one another by an amount equal to an integral multiple of a spacing "C" of the panel bars.

The at least one stiffening element may comprise a head which is centrally arranged on the bar portion.

The invention also provides for a method of producing the lightweight structural component of the type described above, wherein the method comprises milling the at least one panel to form at least one thickened region and joining the two side pieces to the at least one panel at the two separate joint zones.

The method may further comprise extruding the at least one stiffening element. The method may further comprise subjecting the at least one panel to tension. The method may further comprise subjecting the at least one stiffening element to tension.

The invention also provides for a method of producing the lightweight structural component of type described above, wherein the method comprises milling the at least one panel to form at least one thickened region, extruding the at least one stiffening element, subjecting the at least one panel to tension, subjecting the at least one stiffening element to tension, and joining the two side pieces to the thickened region at the two separate joint zones.

The joining may comprise joining the two side pieces to the at least one thickened region by laser beam welding. The joining may comprise joining the two side pieces to the at least one thickened region by laser beam welding, and wherein a laser beam focus is formed such that it is one of extended in a feed direction and divided into two partial beams. The joining may comprise joining the two side pieces to the at least one thickened region by friction stir welding. The joining may comprise joining the two side pieces to the at least one thickened region by adhesion. The joining may comprise joining the two side pieces to the at least one thickened region by adhesive bonding. The joining may comprise simultaneously joining the two side pieces to the at least one thickened region. The joining may comprise unilaterally joining the two side pieces to the at least one thickened region.

The joining may comprise joining the two side pieces one at a time to the at least one thickened region. The two side pieces may be formed by extrusion.

The method may further comprise extruding the at least one stiffening element and the two side pieces to form a one-piece extruded member. The method may further comprise forming the at least one stiffening element as an extruded rib, wherein the two side pieces comprise inner curved surfaces, and wherein the thickened region comprises a curved surface.

The milling may comprise chemical milling. The milling may comprise mechanical milling. The milling may comprise HSC milling.

The method may further comprise extruding the at least one stiffening element and thereafter splitting the two side pieces by splitting using press rollers. The method may further comprise extruding the at least one stiffening element and thereafter forming the two side pieces by rolling. The method may further comprise positioning a stiffening element between the two side pieces of the at least one stiffening element and a surface of the at least one thickened region.

The method may further comprise connecting a stiffening element to at least one of the two side pieces of the at least one stiffening element and a surface of the at least one thickened region. The method may further comprise connecting by mechanical deformation a stiffening element to at least one of the two side pieces of the at least one stiffening element and a surface of the at least one thickened region. The mechanical deformation may comprise rolling-in. The connecting may comprise at least one of force-locking and form-locking connecting.

The method may further comprise forming by co-extrusion the at least one stiffening element and a reinforcing element. The method may further comprise, before the joining, tensioning at least one of the at least one stiffening element and the at least one panel. The method may further comprise, during the joining, tensioning at least one of the at least one stiffening element and the at least one panel.

The invention also provides for a method of producing the lightweight structural component of the type described above, wherein the method comprises milling the at least one panel to form the at least one thickened region and joining the two side pieces to the thickened region at the two separate joint zones.

The invention also provides for a method of producing the lightweight structural component of the type described above, wherein the method comprises milling the at least one panel to form the at least one thickened region, forming as a one-piece member the at least one stiffening element and the two side pieces, and joining the two side pieces to the thickened region at the two separate joint zones.

The invention also provides for a lightweight structural component comprising a metal panel comprising at least one thickened region, at least one stiffening element coupled to a surface of the at least one thickened region, the at least one stiffening element being a one-piece metal member and comprising at least a bar portion and two side pieces extending from the bar portion, the bar portion comprising a first thickness, each of the two side pieces comprising a second thickness, the first thickness being greater than the second thickness, and ends of the two side pieces being at least partially connected to the at least one thickened region by two separate weld joint zones.

The bar portion and two side pieces of the at least one stiffening element may form a generally Y-shaped cross-section. The bar portion and two side pieces of the at least one stiffening element may form a generally T-shaped cross-section. The at least one stiffening element may have a generally I-shaped cross-section.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 3a-c show a comparison of the bending stresses in a laser beam-welded stringer/skin connection according to the prior art to the stringer/skin connection according to the invention;

DETAILED DESCRIPTION OF THE PRESENT INVENTION

Figure 1:
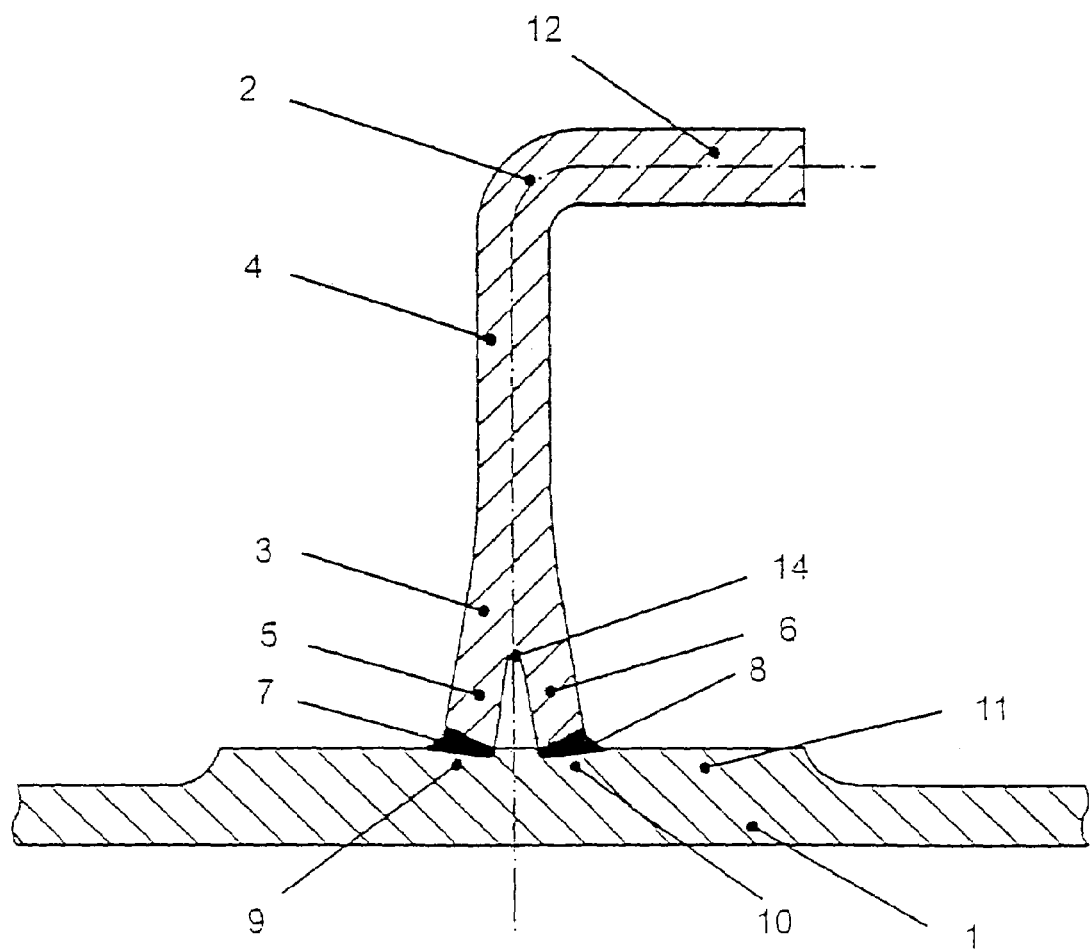
FIG. 1 shows a cross section of a lightweight structural component in a first embodiment that is particularly simple to produce.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The following are examples of non-limiting embodiments:

EXAMPLE 1

The lower fuselage of an aircraft is to be embodied with a higher dent resistance and an improved stiffness. At the same time, production costs and weight are to be reduced. To this end, a riveted construction is replaced by a laser beam-welded construction in a configuration according to the invention, as shown in FIG. 1 for the stringer/panel variant.

The panel 1 includes a panel base 11. A stringer 2 normally embodied with a stringer head 12 and stringer bar 4 features on its side facing the skin sheet 1 two side pieces 5, 6. The lower sides of the two side pieces 5, 6 extend from the stringer foot 3 and run horizontally. In this way, they rest on a level panel base 11. Both side pieces 5, 6 are connected in a material-locking and/or fixedly secured manner to the panel base 11 with two separate joint zones 7, 8. The center-lines of the joints 7, 8 can form an angle of respectively γ=approximately 20° to the surface of the panel base 11 (see FIG. 2). The joint zones 7, 8 are produced by laser beam welding. The sum of the depths of the two joint zones can correspond to the stringer thickness $d_S$. See FIG. 2 for illustration of this dimension.

Figure 2:
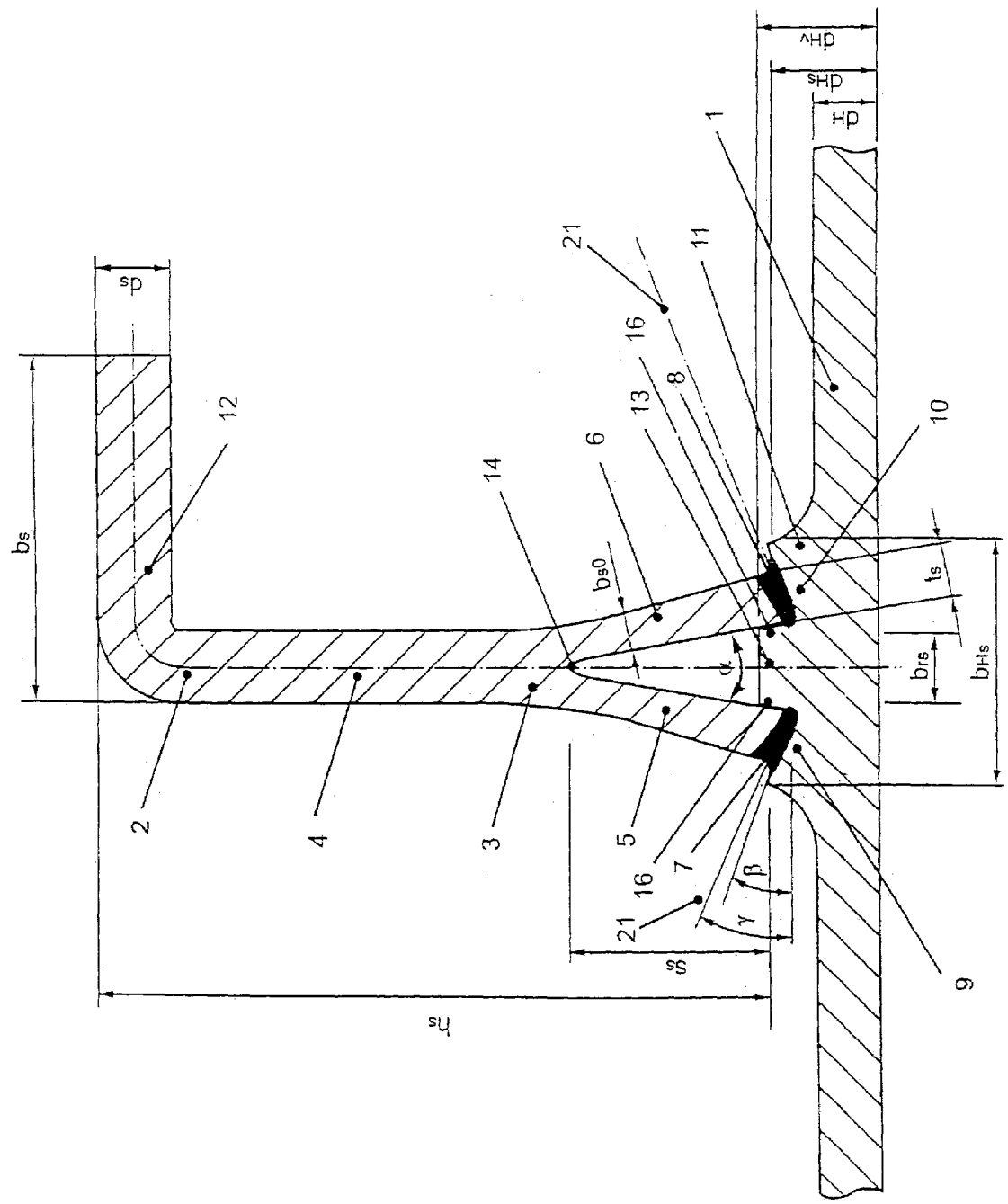
FIG. 2 shows a cross section of a structural component according to the invention for higher demands with regard to damage tolerance.

The following exemplary dimensions are selected for the embodiment of the lightweight element shown in FIG. 1 (the dimensions are measured in the same way as the corresponding dimensions in FIG. 2):

Panel thickness: $d_H$=approx. 1.6 mm, stringer height: $h_s$=approx. 31.5 mm, thickness of the panel base: $d_{Hs}$=approx. 2.4 mm, width of the panel base: $b_{Hs}$=approx. 23 mm, side piece length $s_s$=approx. 8.5 mm, stringer thickness $d_s$=approx. 3.3 mm, stringer head width: $b_s$=approx. 17.5 mm, side piece thickness in the plane of the joint zone and connection depth of the weld seams $t_s$=approx. 1.65 mm, angle between the two side pieces 5, 6 α=approx. 40°, spacing of the inside edges of the two side pieces on the panel base $b_{rs}$=approx. 3.0 mm. Both stringer and panel are produced from a weldable Al (aluminum alloy) material, in this case from alloy 6013 T4. The thickened panel base 11 of the skin sheet 1 is preferably formed from the skin sheet by chemical milling, but may be formed by other acceptable material removing or sheet forming techniques. The stringers 2 which include the side pieces 5, 6 are preferably formed by extrusion, but can be formed by other acceptable techniques. Subsequently, the panel 1 is tensioned by way of a vacuum tensioning device (not shown). By way of a following tensioning unit integrated in the welding head, the stringer 2 is positioned symmetrically on the panel base 11 and pressed on the panel 1 by the application of a force of approx. 20 kg. Through lateral rolling, the position of the two side pieces 5, 6 relative to one another is prevented from changing due to the compressive force or due to lateral forces caused by the alignment of the stringers 2 on the panel 1.

Joining is carried out with two $CO_2$ lasers using a power of approx. 2,800 W (watts) each. Work is performed with wire-shaped weld filler of alloy AlSi12 to avoid hot cracks. The welding wire has a diameter of approx. 0.8 mm and is fed at a wire feed speed of approx. 4,500 mm/min. The welding speed is 4 400 mm/min. To minimize distortion, welding takes place from both sides simultaneously. The angle γ=approx. 200 and is set as the angle γ between the laser beam axis and surface of the panel 1.

According to the experts, e.g., Heider *Lasergerechte Konstruktion und lasergerechte Fertigungsmittel zum Schweißen großformatiger Aluminium-Strukturbauteile in VDI—Fortschrittsberichte*, series 2: Fertigungstechnik, no. 326, VDI-Verlag Düsseldorf (1994), the disclosure of which is hereby expressly incorporated by reference in its entirety, a stringer/skin connection that is low in welding defects (hot cracking, porosity, discharge) can only be achieved through welding from both sides simultaneously while guaranteeing a common melting bath of the two laser beams.

However, recent tests have shown that crack-free weld seams that are low in pores and free of discharge can also be achieved by way of a suitable beam formation of the normally circular laser beam focus. The separation of the laser beam into two beams lying one behind the other in the feed direction has proved to be particularly favorable. A twin spot mirror is therefore used to avoid discharge and to reduce porosity. Approx. 0.3 mm is selected as the spacing of the foci with a division of the two power portions in a ratio of approx. 60:40 with a laser power of approx. 3,500 W.

After adjusting all the parameters, the welding process is started and the joint line is traced in a CNC-controlled manner with the stringer tensioning unit following. After welding, the panel 1 is conditioned, i.e., artificially aged to condition T6.

The ribs can also be embodied with identical geometric dimensions apart from the height and head of the stiffening element 2. In addition it should be ensured hereby that the panel 1 is curved with a radius R=approx. 2,820 mm. This means that the ribs have to be embodied in a curved manner such that the lower side of the two side pieces 5, 6 describes a cylinder shell with the same radius. This is realized in that during extrusion a transverse force is exerted in the direction of the rib head after the extrusion die. In process terms, the joining of the ribs takes place analogously to that of the stringers.

As a result of this, a stiffer aircraft fuselage lower shell, that is more resistant to buckling and cyclical compressive loading, is advantageously obtained in a manner that is quicker, more cost-effective, and without increased weight compared with riveting.

In this simplest embodiment the lightweight element according to the invention is also very suitable for the production of stiff aluminum bodies of watercraft, in particular sport and racing boats. Other very advantageous applications include pressure tanks and vacuum tanks.

EXAMPLE 2

Further advantages of the invention are to be explained on the basis of a further developed embodiment that leads to a clearly improved damage tolerance behavior. It is particularly suitable for the side fuselage area but also for the upper fuselage area, i.e., for transverse stress and/or tensile stress.

One preferred geometric embodiment is shown in FIG. 2. In addition to the features specified in exemplary embodiment 1, the panel 1 also features a panel stiffening base 13. The two outer sides 16 of the panel stiffening base 13 are inclined at an angle of approx. α/2 and are thus adapted to the inner sides of the side pieces 5, 6 that are also inclined at an angle of approx. α/2 from the symmetric line (i.e., the center line running through stringer bar 4). The joint surfaces 9, 10 of the base 13 and of the two side pieces 5, 6 are inclined at an angle $\beta \geq$approx. α/2 with respect to the surface of the panel 1. With a weld seam angle γ≈β, the weld seam thus lies generally perpendicular or almost perpendicular to the outer surface of the side pieces 5, 6. In contrast to exemplary embodiment shown in FIG. 1, here the side pieces 5, 6 are embodied with varying thickness and/or are tapered towards the side piece foot, i.e., the side piece thickness in the plane of the joint zones $t_s$ is greater than the side piece thickness $b_{s0}$ near the branching point 14 of the two side pieces 5, 6.

This stringer/skin connection is, e.g., designed with the following dimensions: stringer height $h_s$=approx. 37 mm, stringer head width $b_s$=approx. 21 mm, stringer thickness $d_s$=approx. 4.4 mm, thickness of the panel $d_H$=approx. 2.4 mm, thickness of the panel base $d_{Hs}$=approx. 3.4 mm, thickness of the panel stiffening element 13 $d_{Hv}$=approx. 5.0 mm, width of the panel base $b_{Hs}$=approx. 15.2 mm, width of the panel stiffening base $b_{rs}$=approx. 9.2 mm, side piece thickness near the branching point of the two side pieces $b_{s0}$=approx. 2.2 mm, side piece height $s_s$=approx. 11.0 mm, side piece thickness in the plane of the joint zone and simultaneously connection depth of the weld seam $t_s$=approx. 2.7 mm, angle between the two side pieces α=approx. 40°, angle between the joint surface 7, 8 and the panel β=approx. 22.0°, radius in the branching point 14 is approx. 0.6 mm.

Apart from the manufacture of the panel stiffening base 13, the production steps run analogously to those in example 1. To guarantee a matching configuration between the inner sides of the two side pieces 5, 6 and the side surfaces of the panel stiffening base 13 and the joint surfaces 9, 10, this section is worked by HSC milling on the panel 1 previously produced by chemical stripping. However, it is also possible to omit the chemical stripping completely and to produce the entire thickness profile of the skin sheet 1 by HSC milling.

The following values have been selected as welding parameters: laser power approx. 2,800 W, welding speed approx. 4,000 mm/min, wire feed speed approx. 4,000 mm/min. The inclination of the laser beam axis to the surface of the panel is adjusted according to the inclination of the joint surfaces to γ=approx. 22.2°. All the other welding parameters are selected analogously to those of example 1 as described above.

The lightweight fuselage shell thus produced features particularly high values with regard to direct tensile strength, dent stability and buckling stability as well as damage tolerance.

Compared with the normal variant that is laser beam-welded from both sides simultaneously and that has the same stringer thickness $d_s$=approx. 4.4 mm, the direct tensile strength is increased from approx. 230 MPa to approx. 325 MPa. Moreover, the scatter width of the determined cross tension values is significantly reduced. Regardless of the higher direct tension values, with comparable loads the material strain in the weld seam plane in the variant according to the invention is lower because the connection width is increased from approx. 4.4 mm to approx. 2×2.7 mm=approx. 5.4 mm.

In this case the following ratios are realized according to one embodiment: $t_s/d_s$=approx. 0.61; $b_{s0}/t_s$=approx. 0.81; $s_s/h_s$=approx. 0.30; β=approx. 22°. In the event that a subsequent artificial aging is to be omitted, the side piece thickness in the plane of the joint zone and connection depth of the weld seam $t_s$ can be increased to $t_s$=approx. 4.9 mm. The following would thus apply with the other geometric parameters kept constant: $t_s/d_s$=approx. 1.11; $b_{s0}/t_s$=approx. 0.45.

The improvement regarding the use in fuselage shells loaded by transverse stress is explained in FIGS. 3*a*-*c*. Through the asymmetrical embodiment of the stringers, a bending moment M in the direction of the bent end of the stringer head 12 acts on the stringer (see. FIG. 3*a*) both during a tensile stress and during a compressive stress and in a particularly marked manner during a transverse stress. The cross section stressed the most thereby lies in the weld seam.

The force F associated with the bending moment leads to an effective bending stress at the weld seam surface of $$\sigma_{Beff}^a = \frac{6 * \alpha_{KB} * F * h_S}{L * d_S^2} \quad (I)$$

with $\alpha_{KB}$ as a notched form factor for bending in the position of the weld seam and L as panel or stringer length.

In the solution according to the invention, however, the cross section stressed most in terms of bending no longer lies in the weld seam itself, but in the plane of the side piece branching (see FIG. 3*c*). Due to the changed leverage conditions and the much larger notch radius compared with the weld seam, the effective bending stress in the most stressed area is reduced to $$\sigma_{Beff}^{cO} = \frac{6 * \alpha_{KB}^r * F * (h_S - s_S)}{L * d_S^2} \quad (II)$$

with $\alpha^r_{KB}$ as a notched form factor for bending at the site of the side piece branching with the radius r. If the tensions in the respectively most highly stressed cross sections in terms of bending are compared, the result is the following diminution factor $R_1$:

$$R_1 = \frac{\sigma_{Beff}^{cO}}{\sigma_{Beff}^a} = \frac{\alpha_{KB}^r * (h_S - s_S)}{\alpha_{KB} * h_S} \quad (III)$$

With the above values of the geometric dimensions and $\alpha_{KB}$≈3, $\alpha^r_{KB}$≈1.1, a stress diminution factor of $R_1$≅0.26 results. This means that the highest effective bending stress is reduced to approx. 26% through the embodiment according to the invention and in addition is displaced from the weld seam to a region that is not microstructurally damaged.

The bending stress in the weld seam due to the supporting effect of the lower side piece in FIG. 3*c* is approximately replaced by a tensile stress $\sigma^c_{Zeff}$ at $$\sigma_{Zeff}^c = \frac{\alpha_{KZ} * h_S * F}{s_S * t_S * L * \sin[2 * \arctan(b_{rs}/2 * s_S)]} \quad (IV)$$

(with $\alpha_{KZ}$ as notched form factor for tensile stress at the site of the weld seam).

Analogously to the diminution factor $R_1$, a diminution factor can also be defined for the stress in the weld seam $R_2$ due to the effect of the bending moment M:

$$R_2 = \frac{\sigma_{Zeff}^c}{\sigma_{Beff}^a} \quad (V)$$

$$R_2 = \frac{\alpha_{KZ} * d_S^2}{6 * \alpha_{KB} * s_S * t_S * \sin[2 * \arctan(b_{rs}/2 * s_S)]} \quad (VI)$$

With the values given in example 2 and $\alpha_{KZ}$≈$\alpha_{KB}$, in a rough calculation the result is $R_2$=approx. 0.15. This means that with the solution according to the invention the bending moments on the weld seam resulting from the asymmetrical design of the stringers are very slight and, in contrast to the previous solution, a deterioration of the properties can be ruled out.

To sum up this means that the material strain as a result of compressive stress, transverse stress or tensile stress in the critical weld seam area is reduced and that laser beam welded integral structures can thus also be used for side and upper shells.

Compared with the solution according to the invention, other solutions for reducing material strain caused by bending, such as, e.g., a thickening in the stringer bar or the thickening of the stringer foot according to FIG. 3b are much less effective. If, for example, only the stringer foot is thickened, the direct tensile strength is reduced and the bending stress in the weld seam, reduced but still present, reduces loading capacity in particular during transverse stress or tensile stress. Moreover, the fact that much greater weld seam depths are necessary to compensate for the reduction in direct tensile strengths, which seam depths lead to an increase in deformation, has a negative effect.

With the stress type "crack growth with broken stringer," the fact that the panel stiffening base 13 reduces the stress concentration near the crack tip in the direct vicinity of the weld seam has a positive effect. The weld seam is thus subject to a reduced elongation amplitude, which leads to a locally lower crack growth rate. Even after the failure of the weld seam in the first side piece, the crack growth rate is reduced by the crack branching and the material thickening in the skin sheet. Moreover it is important that the stringer still does not lose its stabilizing effect even after the failure of the first weld seam and of the first stringer side piece. Overall, an improved damage tolerance and residual strength are thus achieved.

Further advantages exist regarding the avoidance of unintentional damage to the weld seam during assembly of the fuselage panel, during disassembly of the fuselage interior or in the event of repair. Whereas, for example, with a stiffening element/skin connection carried out according to the prior art, an unintentional mechanical stress (e.g., through bumping during assembly) crosswise to the stiffening element (rib or stringer) cracks can occur in the weld seam at an early stage even before the development of any signs on the stiffening element (e.g., visibly permanent deformation), with suitable dimensions of the stiffening element according to the invention, the plane of the side piece branching can serve as desired deformation point that reacts before damaging stress or deformation conditions are reached in the weld seam.

From the point of view of quality assurance, the fact that— due to the separate position of the weld seams—even maximum cross section weaknesses, such as those that can occur due to discharge or very long communicating pores, can cover no more than approx. 50% of the total cross section of both weld seams, has a positive effect. The fact that the requirements for guaranteeing high quality, faultless weld seams have been noticeably reduced has a very advantageous impact in welding technology terms for the following reasons:

The foci of the two laser beams no longer have to meet exactly. This reduces the requirements for precision control of the welding equipment, in particular during the welding of parts that are not flat.

Bond faults are easier to avoid because the angle between the laser beam axis and the joint surface, which currently cannot be reduced much under 20° due to the dimensions of the laser beam weld heads, can be reduced to 0° because of the inclination of the joint surfaces now possible. The requirements for precision control of the laser beam perpendicular to the feed direction and the risk of bond faults forming are thus also reduced.

Through the elimination of the previous demand for an angle between joint surface and laser beam axis and the resulting predetermined minimal weld seam width, a lower linear energy can be used in welding, which reduces deformation.

From the point of view of welding technology, welding safety and deformation, the requirement for welding from both sides simultaneously can be eliminated.

Figures 4A, 4B:
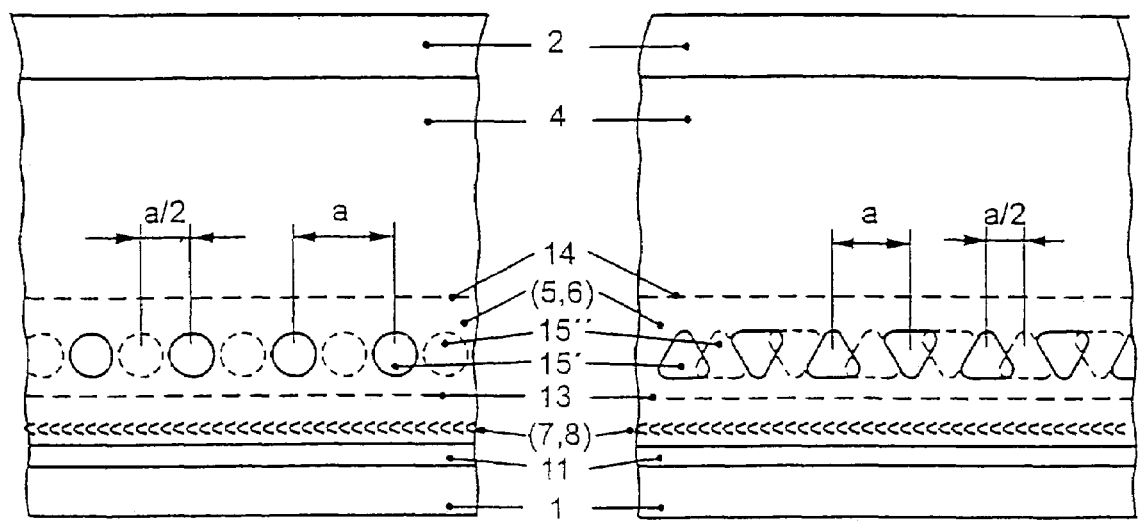
FIGS. 4a and 4b show an alternative embodiment for the design of stringers or ribs with integrated crack stoppers.

For even more exacting demands on damage tolerance, the two side pieces 5, 6 can be provided with cut-outs, as shown in a side view in FIGS. 4a and 4b. These cut-outs act as crack stoppers, since a crack penetrating into them in order to spread further first has to initiate a new crack. Shape and size of the cut-outs 15', 15" are selected thereby such that they entail the lowest possible loss of stiffness in the longitudinal direction of the stiffening element, while on the other hand acting as an effective crack stopper for a crack that has crossed the weld seam. The shape of the cut-outs can thereby be selected to be circular, oval, a slit or a rounded triangle. The cut-outs 15', 15" of the two side pieces 5, 6 are thereby made in a manner displaced and/or offset from or relative to one another. With only a small reduction in the stiffness of the stiffening element 2 it is thereby ensured that the crack leads out into a cut-out, thus increasing the damage tolerance.

EXAMPLE 3

Figure 10:
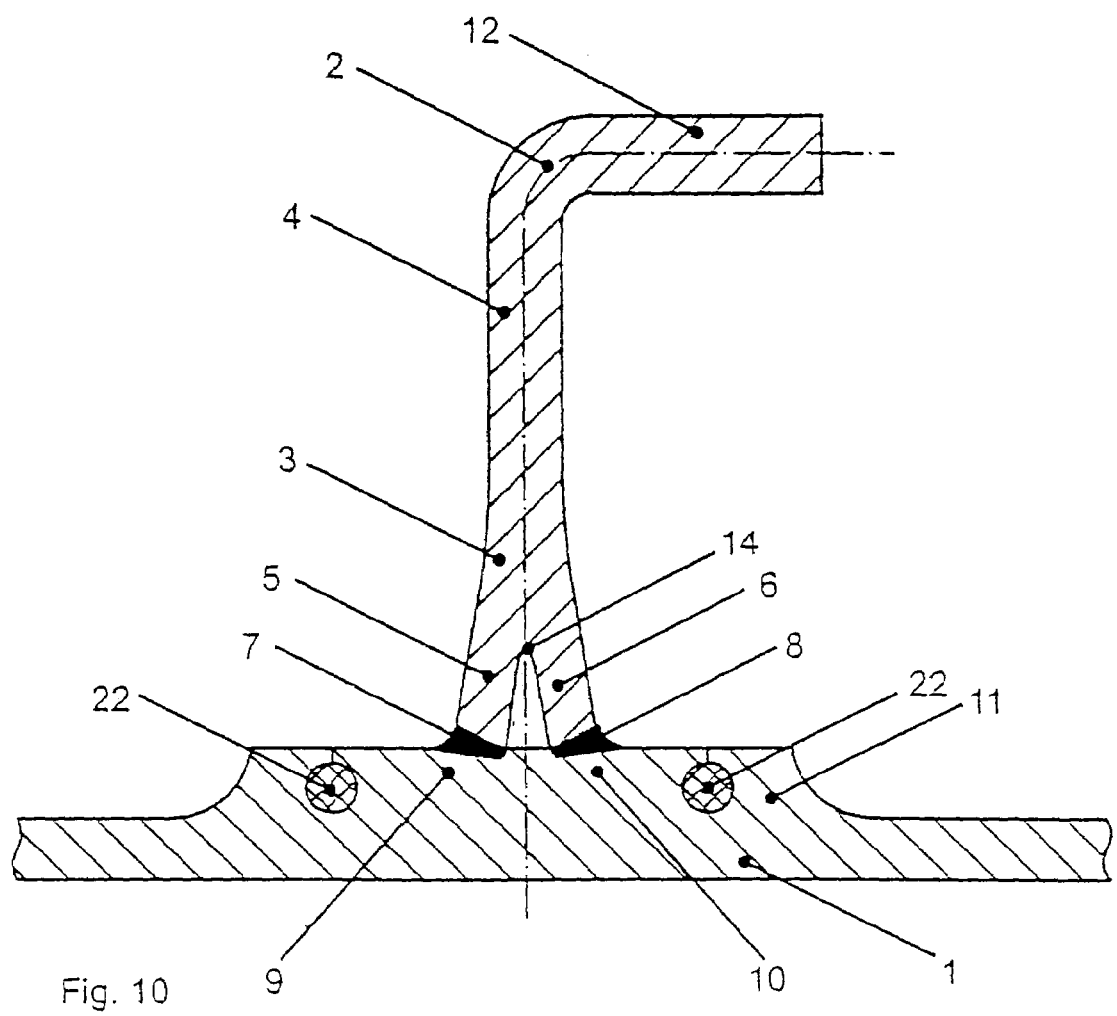
FIG. 10 shows a cross section of an embodiment in which wire-shaped stress-relief elements are located inside the skin sheet in the direct vicinity of the two weld zones.
Figure 11:
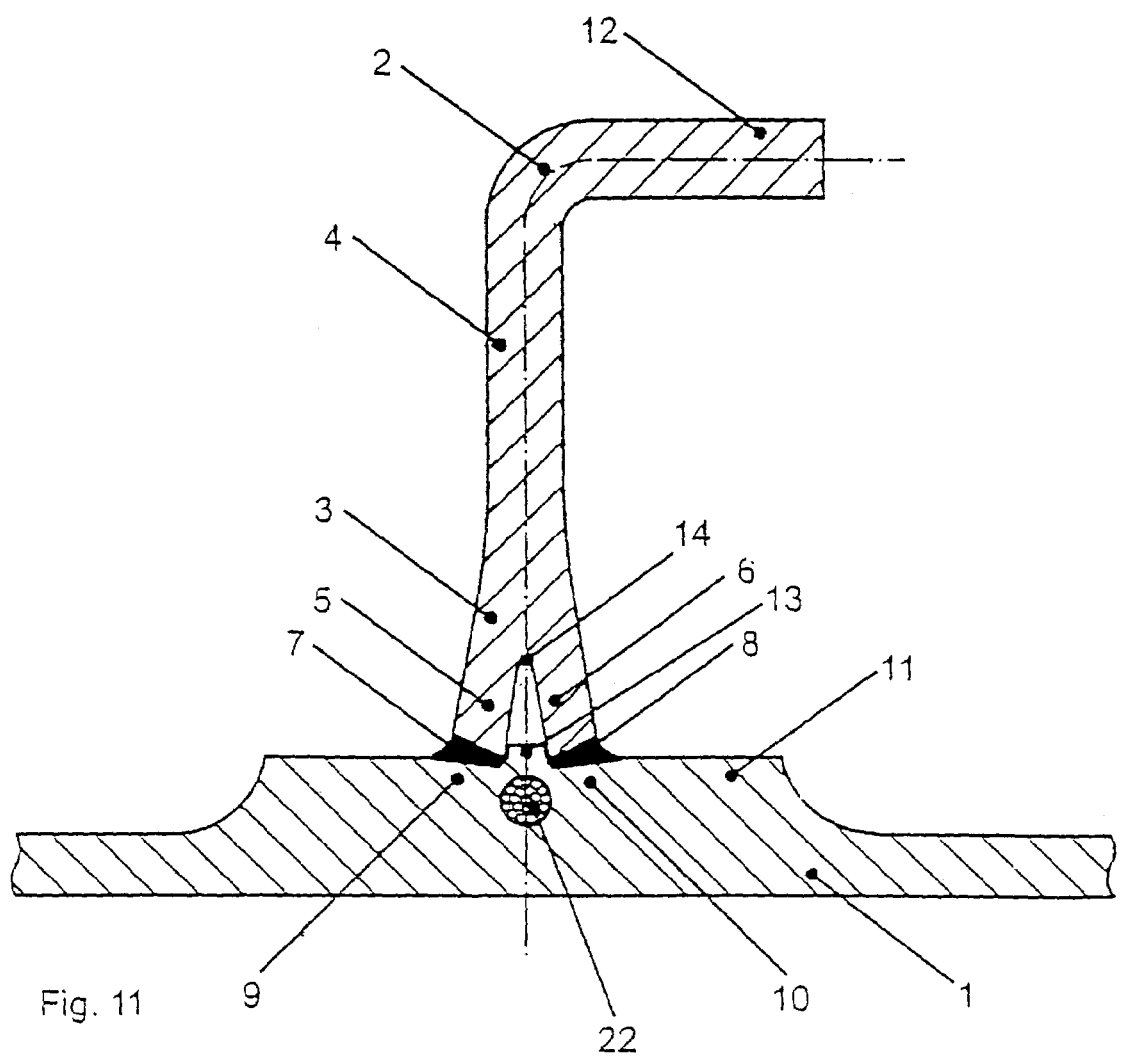
FIG. 11 shows a cross section with a wire cable-shaped stress-relief element directly beneath the panel stiffening base.

Another variant for improving the damage tolerance of welded panel/stringer connections is explained in FIGS. 10 and 11.

High tensile stresses prevail in the upper shell area along the weld seams in a stringer/skin connection. They can be reduced by stress relief elements embedded in the panel base parallel to the stringer. In one preferred embodiment they comprise wires of high-strength steel, titanium or Ni materials. Their positive effect regarding damage tolerance is due to two effects: firstly, due to their higher modulus of elasticity they put up a higher resistance to an elongation along the wire axis than the skin material surrounding them or the weld seam, so they relieve the stress on their surroundings. The crack growth rate is thus reduced when the crack approaches the stress relief element and thus the weld seam. Secondly, the residual strength is improved, because the stress relief element still remains intact after the crack has crossed the surroundings of the stress relief element.

According to the invention, several embodiments are possible. According to FIG. 10, in a preferred embodiment, e.g., two multicore, high-strength wires 22 made of an Inconel alloy can be rolled (or otherwise placed) into the panel base directly to the right and left of the two weld seams. The effect of the relief of stress on the weld seam is particularly marked in this arrangement. A mechanically sufficiently load-bearing connection of the stress relief elements to the panel is achieved through the rolling in and the structured surface of the wire cable.

In another arrangement shown in FIG. 11, the stress relief element 22 is rolled in (or otherwise placed) directly beneath the panel stiffening base. In this embodiment the insertion of the stress relief element 22 can be coupled in a particularly favorable manner with the production of the panel stiffening base by way of metal forming.

EXAMPLE 4

Figure 5:
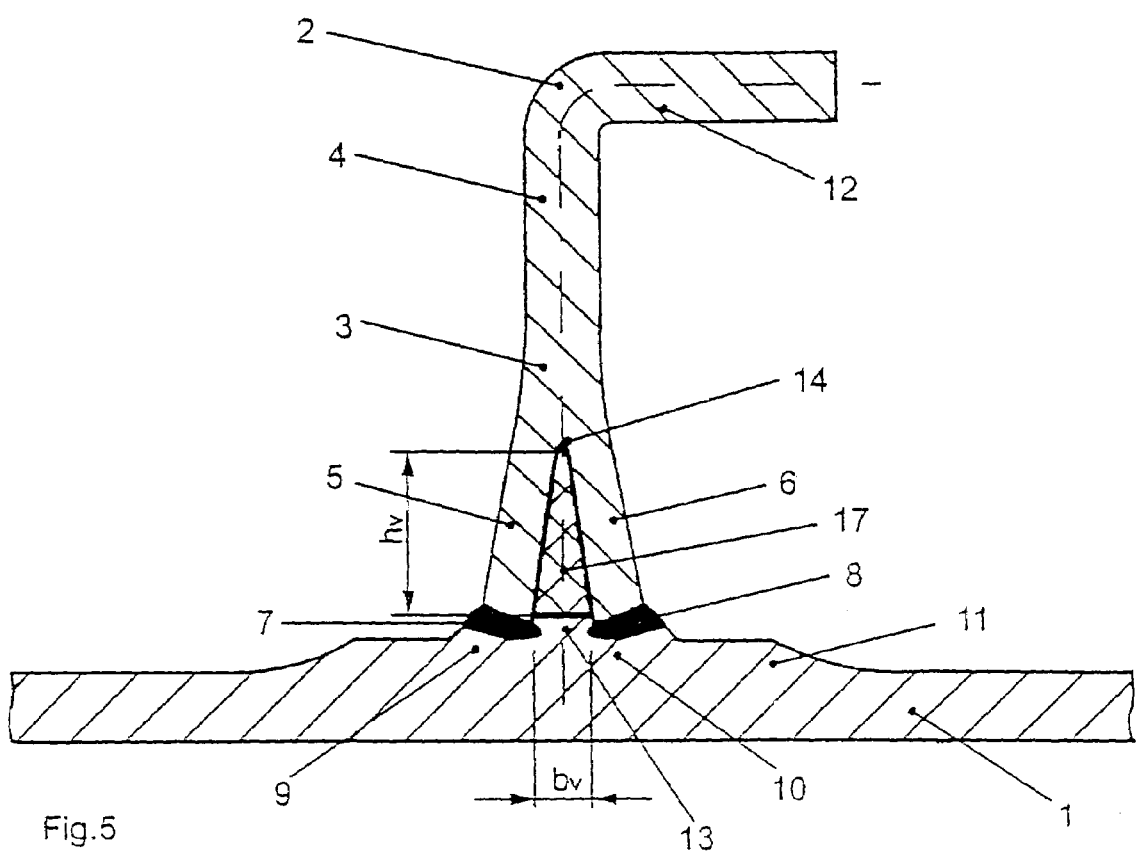
FIG. 5 shows a cross section through a stringer/skin connection that is embodied by an inserted reinforcing element for highest demands with regard to transverse stress capacity, damage tolerance and residual strength.
Figure 6:
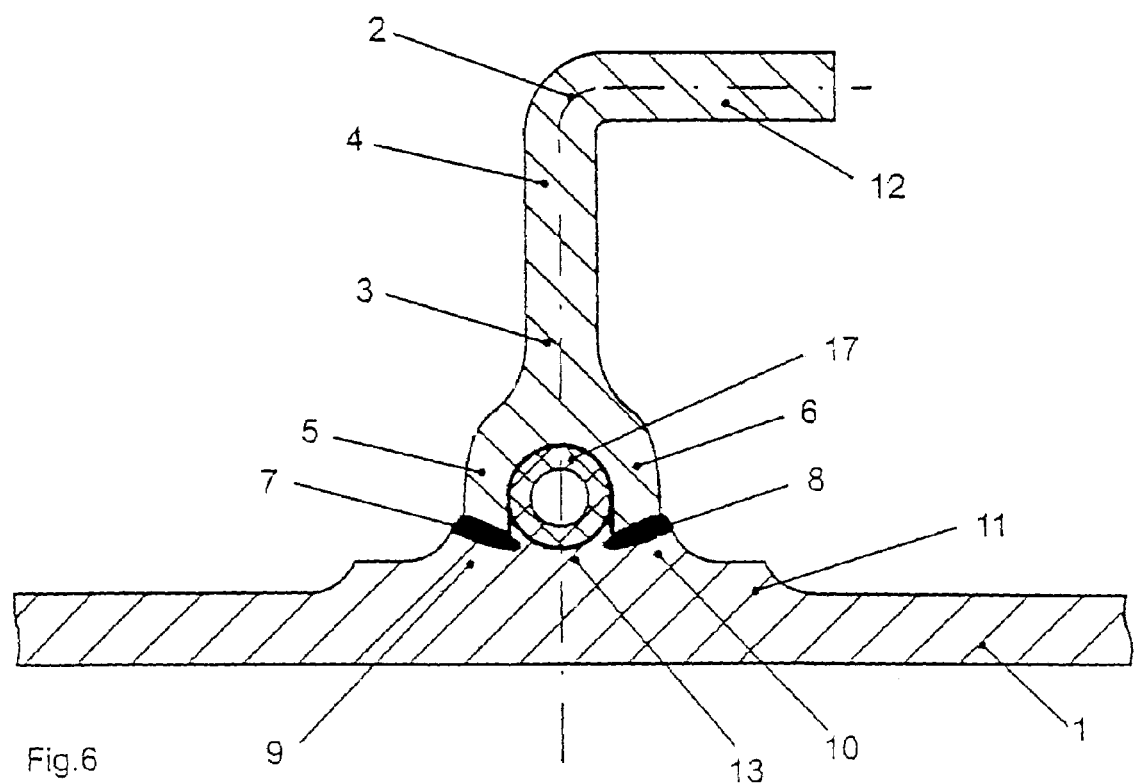
FIG. 6 shows a cross section of the most highly stress-resistant stringer/skin connection in still another embodiment.
Figure 7:
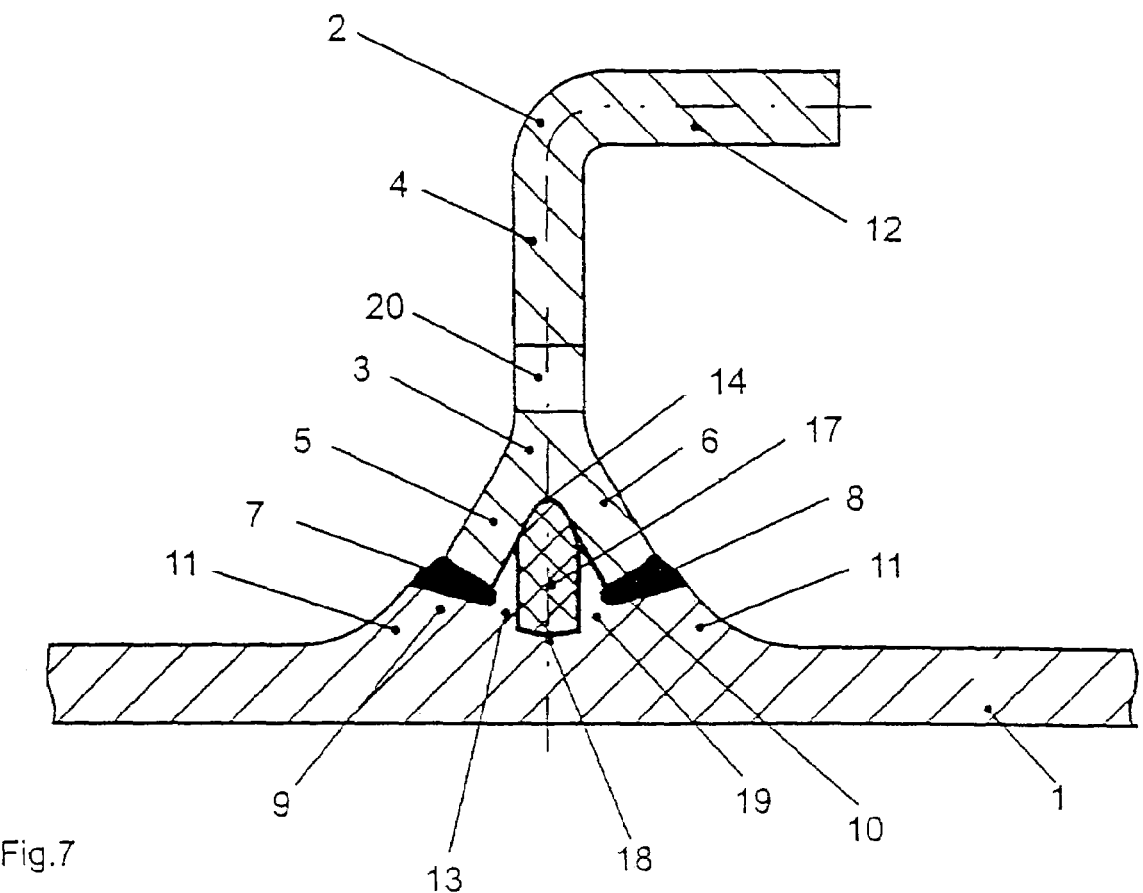
FIG. 7 shows a cross section of a highly stress-resistant stringer/skin connection in still another embodiment.

The exemplary embodiments shown in more detail in FIGS. 5 through 7 are designed for particularly exacting demands with regard to damage tolerance.

These embodiments utilize a reinforcing element 17 of a higher modulus of elasticity compared to the skin 1. The stiffening element material 17 is located in the cavity formed by the two side pieces 5, 6 and the panel stiffening base 13. In the exemplary embodiment, the reinforcing element 17 is made of the titanium alloy Ti6Al4V. The modulus of elasticity is approx. 110 GPa compared to the Al alloy used at approx. 71 GPa. As shown in FIG. 5, the reinforcing element has the cross section of an isosceles triangle with a rounded-off tip. An arrangement of intersecting grooves (not shown) can also be impressed in one or all of the surfaces of the reinforcing element 17 by way of roller burnishing.

To realize the arrangement shown in FIG. 5, the same dimensions for the panel 1 and stiffener 2 can be selected as in exemplary embodiment shown in, e.g., FIGS. 1, 2 and 10. The dimensions of the reinforcing element 17 can accordingly be as follows: Base width: $b_v$=approx. 9.2 mm, height: $h_v$=approx. 10.4 mm.

The process steps are likewise selected analogously to exemplary embodiments described above such as, e.g., the embodiment shown in FIGS. 1 and 2. In addition, the reinforcing element 17 can be rolled into (or otherwise placed into) the stringer 2 after the extrusion of the stringer 2.

The particular advantage of this solution variant with a reinforcing element 17 in the direct proximity of both the weld seams is that during a stressing of the panel in the direction of the stringer longitudinal axis, the elongation in the direct proximity of the weld seam is reduced by the lower elongation of the reinforcing element due to the greater modulus of elasticity and the form-locking or force-locking connection to the stringer. This results in a reduction of the longitudinal tensile stresses in the weld seam. An estimate with the above-mentioned geometric parameters gives a stress diminution in the proximity of the weld seam of approx. 6%. Due to the strong dependence of the crack growth rate on the main stress in the critical stress area of 95 MPa, the result is a clear extension of the service life.

Furthermore, despite the placing of cut-outs 15', 15" in the side pieces 5, 6 of the stringers 2, which can be used in the embodiments shown in FIGS. 5-7, the stiffness of the stringers is not reduced compared with the prior art, so the crack stop function is possible without other disadvantageous consequences, such as reduction of the stiffness of the panel or reduced support function of the stringers.

Due to its higher cracking fatigue strength, the reinforcing element 17 is still intact even when the crack has crossed both weld seams. This temporarily reduces the crack growth rate even after the stringer has subsequently cracked. With increasing crack growth, a load rearrangement occurs on the reinforcing element 17 of the cracked stringer until finally, progressing along the stringer, the force-locking or form-locking connection to the stringer is detached and the reinforcing element is pulled out of the cavity with a consumption of energy. Through this differential failure the residual strength is increased and the damage development before the break is less catastrophic.

The reinforcing element 17 is embodied as a pipe or tube having a circular cross-section in the variant shown in FIG. 6. FIG. 7 presents a variant in which the reinforcing element 17 is rolled into (or otherwise placed in) the skin sheet 1 before welding of the stiffener 2 to the panel 1. In this variant, the prevention of elongation in the weld seam by the reinforcing element 17 is particularly marked.

Figure 8:
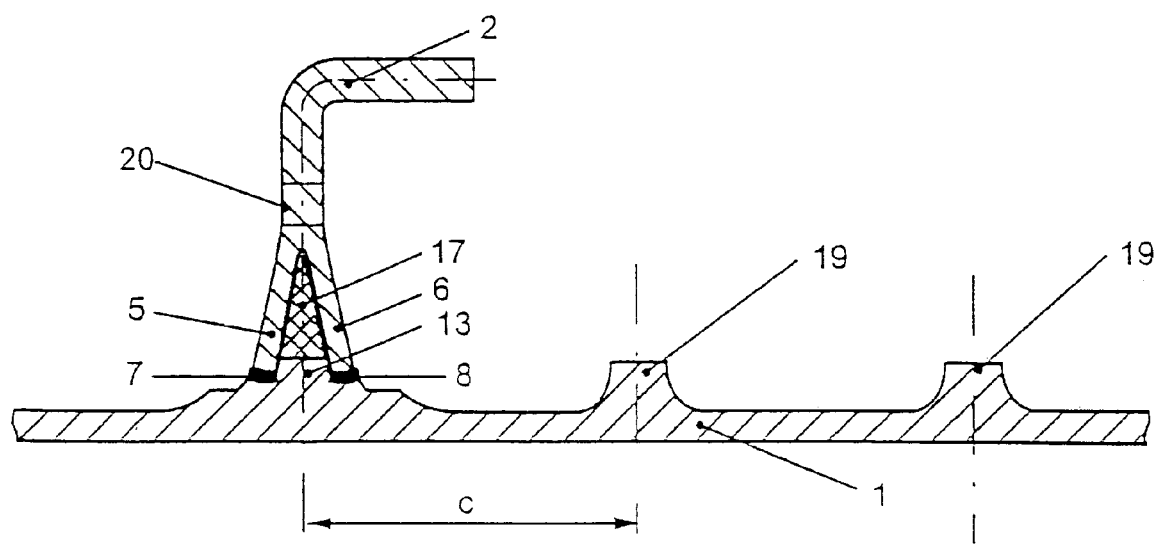
FIG. 8 shows a cross section through an embodiment with additional elements for stiffening the panel.

Because the weld seam is relieved from bending stress by the embodiment of the stringers 2 with two side pieces and the additional local stress-reducing effect of the reinforcing element 17, the stringer head 12 can also be embodied with a greater thickness without a damaging effect (see FIG. 8). This leads to a particularly stiff fuselage shell. For this case, alternatively the spacing of the stringers can also be increased. To obtain larger spacing between stringers, it can be favorable to provide additional panel bars 19 in the panel at distances "C" from the stringer 2 or rib 2. These thickened panel regions or reinforcements 19 can be produced in a particularly simple manner by chemical milling.

EXAMPLE 5

Figure 9:
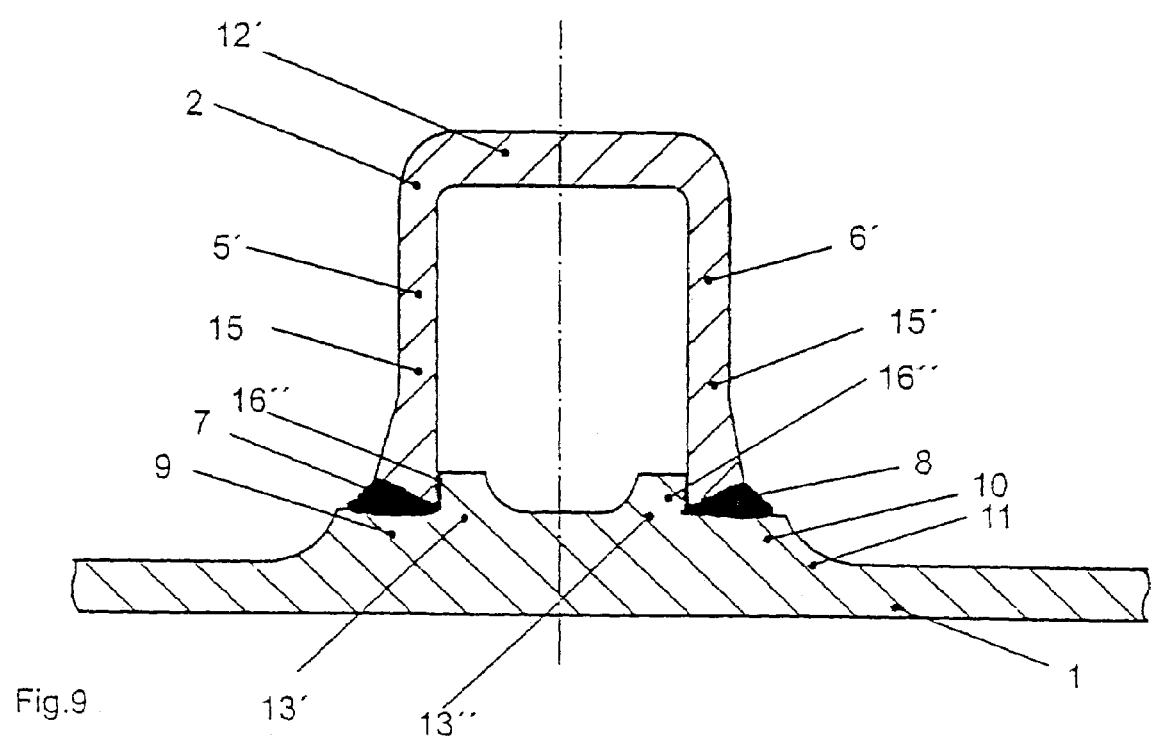
FIG. 9 shows a cross section of an embodiment in which the stiffening element is embodied as a U-profile.

In some cases the stiffening elements 2 have to contain additional attachment parts, load bearing elements or an inner skin in their embodiment as ribs or as stringers. Without violating the inventive concept it can be advantageous for these applications to embody the stiffening element 2 as an upside-down U-profile. FIG. 9 shows a suitable embodiment. The two side pieces 5', 6' are thereby extended up to the head 12' of the stiffening element 2. Another special feature is that the panel stiffening base 13', 13" can be embodied in a divided manner, i.e., first and second panel base sections 13' and 13" to further save weight.

Figure 12:
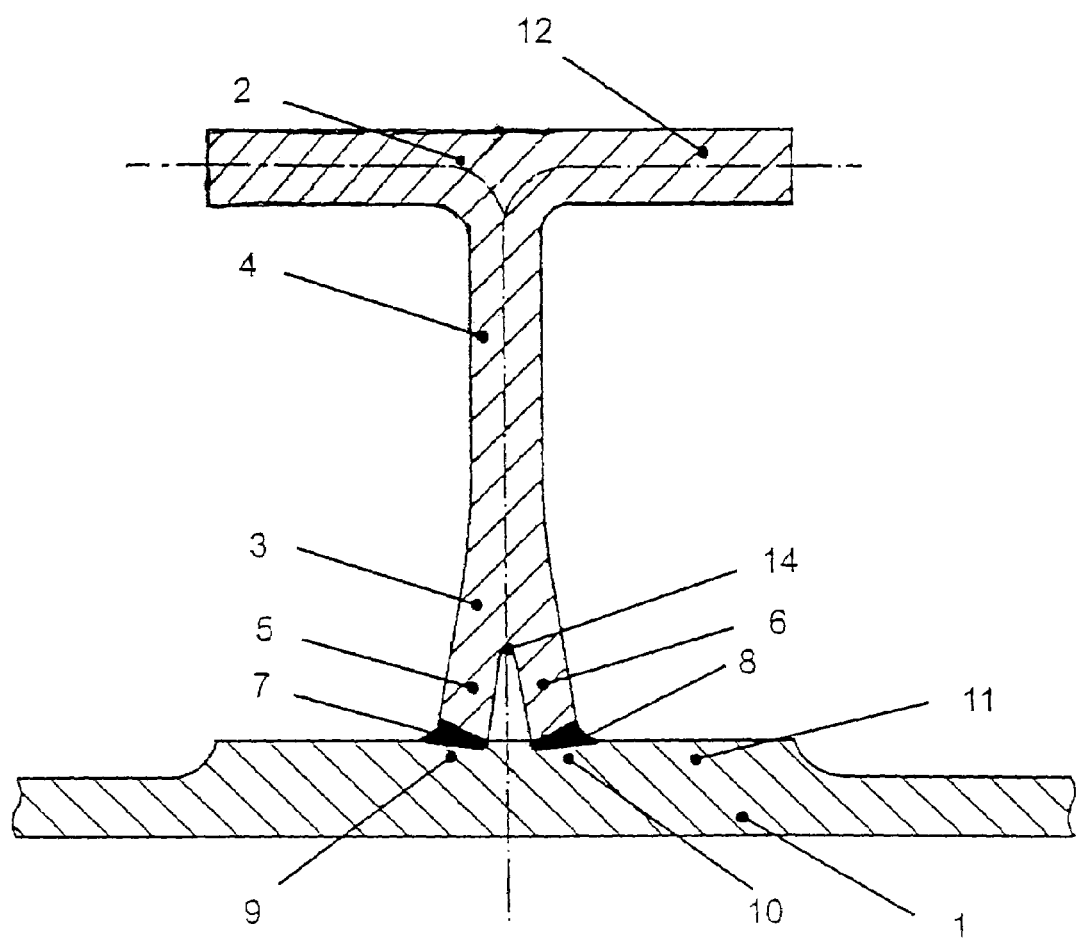
FIG. 12 shows a cross-section of a structural component according to another embodiment of the invention.

The embodiment shown in FIG. 12 is similar to the embodiment shown in FIG. 1 but utilizes a head 12 which extends generally parallel to the panel 1 and which projects generally equally from both sides of the bar 4. The head 12 may be integrally formed with the bar portion 4 and pieces 5, 6 or may be formed separately there from and then fixedly attached to the bar portion 4 using, e.g., welding, rivets, fasteners, adhesive bonding, etc.

Figure 13:
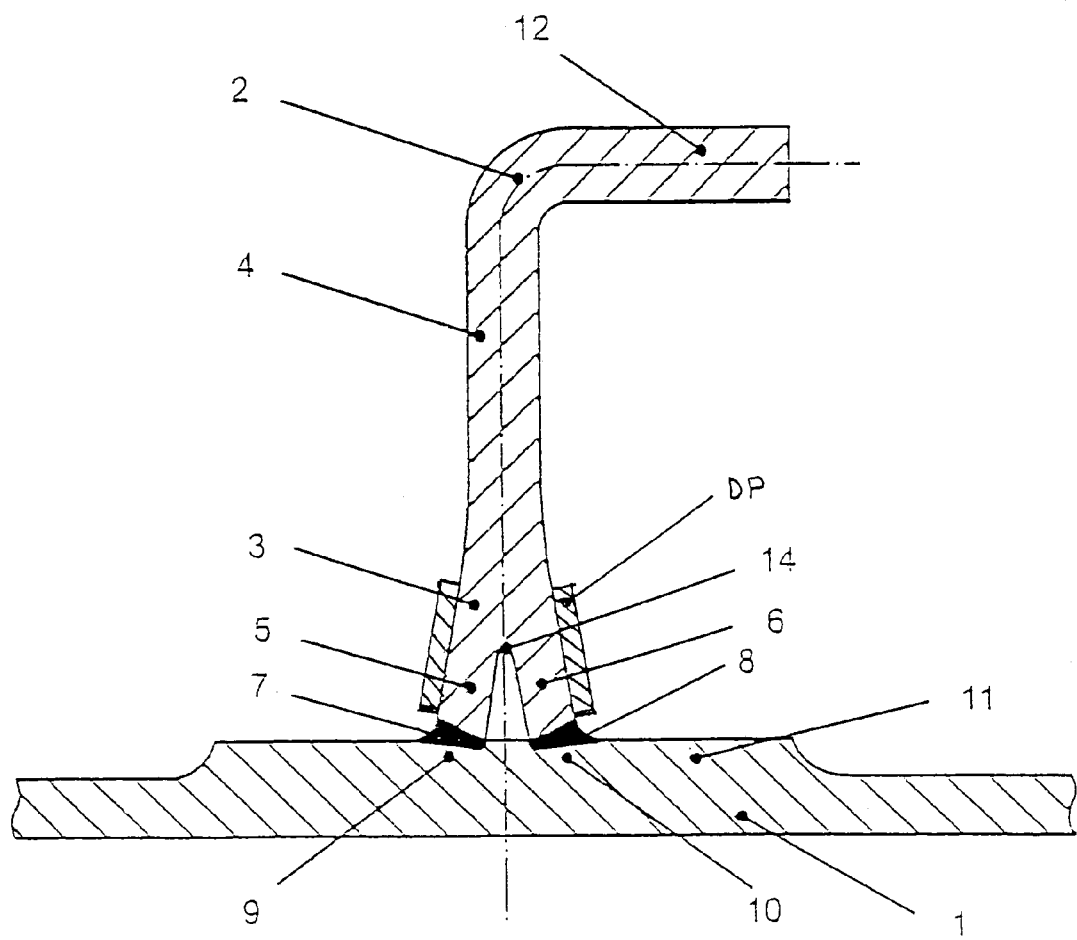
FIG. 13 shows a cross section of a structural component according to still another embodiment of the invention.

The embodiment shown in FIG. 13 is similar to the-embodiment shown in FIG. 1 but utilizes a doubler plate DP made of damage-tolerant, fiber reinforced laminate pieces which are attached to the outer surfaces of the side pieces 5, 6. The doubler plates DP may be fixedly attached to the pieces 5, 6 using, e.g., adhesive bonding, etc.

Figure 14:
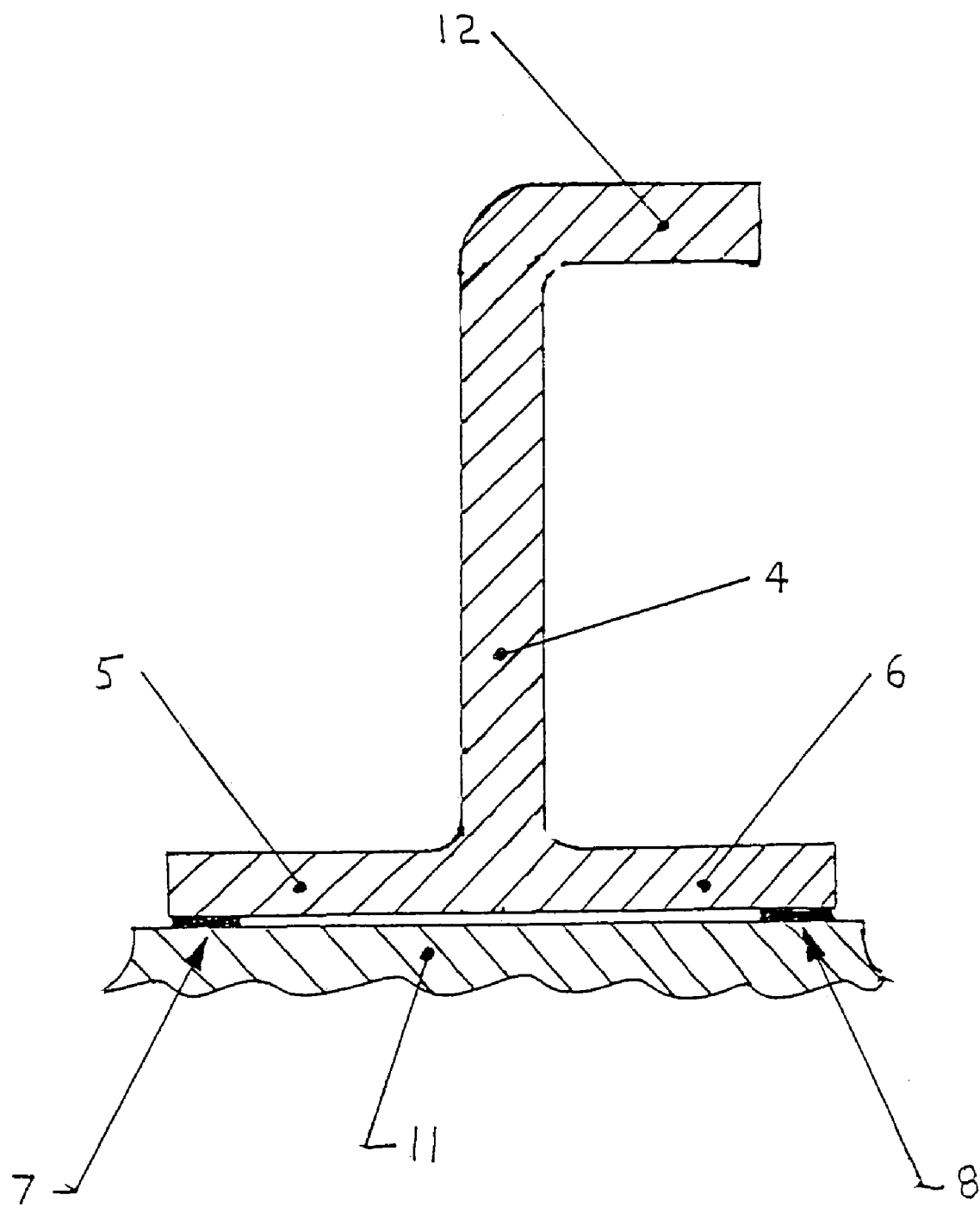
FIG. 14 shows a cross section of a structural component according to still another embodiment of the invention.

The stiffener embodiment shown in FIG. 14 utilizes a T-shaped end whose side pieces 5, 6 are arranged generally parallel to one another, which extends generally parallel to the panel 1, and which projects generally equally from both sides of the bar portion 4. The head 12 may be integrally formed with the bar portion 4 or may be formed separately there from and then fixedly attached to the bar portion 4 using, e.g., welding, rivets, fasteners, adhesive bonding, etc. In this embodiments, the inner surfaces of the side pieces 5, 6 are fixedly attached to the panel base 11 at two separate joint zones 7, 8.

It is noted that the invention contemplates any features shown in one embodiment may be used in another embodiment. Thus, by way of example, the embodiment shown in FIG. 2 may use the T-shaped head 12 shown in FIG. 12 in place of the L-shaped head. The embodiments shown in FIGS. 1, 2, and 5-14 may utilize the cut-outs shown in FIGS. 4a-b or the cut-outs 20 of FIG. 7 in any desired arrangement. The head 12 in each embodiment may be oriented in any desired angle relative to the bar portion 4 instead of being generally perpendicular thereto and may be omitted altogether. Each embodiment may utilize any desired arrangement of reinforcements 17 and/or stress relief elements 22, including the disclosed arrangements. Additionally, each embodiment may utilize the doubler plates DP.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

List of Reference Numbers

1 Skin sheet, panel
2 Stiffening elements, stringers, ribs
3 Foot of the stiffening element, stringer foot, rib foot
4 Bar of the stiffening-element, stringer bar, rib bar
5 Side piece 1
5' Side piece 1 if the stiffening element is embodied as a U profile
6 Side piece 2
6' Side piece 2 if the stiffening element is embodied as a U-profile
7 Joint zone 1
8 Joint zone 2
9 Connection point of joint zone 1, joint surface 1
10 Connection point of joint zone 2, joint surface 2
11 Thickening, panel base
12 Head of the stiffening element, stringer head, rib head
12' Head of the stiffening element if the stiffening element is embodied as a U-profile
13 Panel stiffening base
13' Panel stiffening base if the stiffening element is
13" embodied as a U-profile
14 Branching point of the two side pieces 5 and 6
15' Cut-outs in side piece 1 of the stiffening element
15" Cut-outs in side piece 2 of the stiffening element
16
16' Outer sides of the panel stiffening bases 13, 13', 13"
16"
17 Reinforcing element
18 Recess in the panel stiffening base to accept the reinforcing element
19 Panel bar
20 Cut-out in the bar of the stiffening element
21 Laser beam axis
22 Stress relief element
DP Doubler plate
a Spacing of cut-outs 15' and 15" in the side pieces 1 and 2
a' Spacing of the cut-outs 20 in the bar 4
$b_{Hs}$ Width of the panel base 11
$b_{rs}$ Width of the panel stiffening base, spacing of the two side pieces,5 and 6 on the panel base
$b_s$ Width of the head of the stiffening element, stringer head width
$b_{s0}$ Side piece thickness near the branching of the foot of the stiffening element
$b_v$ Base width of the reinforcing element 17
C Distance of the panel bar from the center line of the stiffening element
$d_H$ Panel thickness
$d_{Hs}$ Thickness of the panel including panel base
$d_{Hv}$ Thickness of the panel including panel stiffening base
$d_s$ Thickness of the stiffening element, stringer thickness, rib thickness
F Force on stringer due to bending moment
$F_v$ Force at branching point due to bending moment
$h_s$ Height of stiffening element, stringer height, rib height
$h_v$ Height of reinforcing element 17
M Bending moment on stringer
R Curvature radius of the panel
$R_1$; $R_2$ Stress diminution factors in the weld seam
R Curvature radius of the transition between the bar of the stiffening element 4 and the two side pieces 5, 6
$s_s$ Side piece height
$t_s$ Side piece thickness in the plane of the joint zone, connection depth of the weld seam
A Angle between the two side pieces 5 and 6
$\alpha_{KB}$ Notched form factor for bending stress
$\alpha_{KZ}$ Notched form factor for tensile stress
$\alpha^r_{KB}$ Notched form factor for bending stress at the site of the side piece branching
B Angle between the joint surface of the joint zone 7 or 8 and panel 1
Γ Angle between laser beam axis 21 and skin sheet
$\sigma^{(a, b, c)}_{Beff}$ Effective bending stress acting on the weld seam in embodiment (a, b, c)
$\sigma^{(a, b, c)}_{Zeff}$ Effective tensile stress acting on the weld seam in embodiment (a, b, c)
$\sigma^{(a, b, c)0}_{Beff}$ Effective bending stress acting on the transition between the bar 4 of the stiffening element and the two side pieces 5, 6 in embodiment (a, b, c)

What is claimed:

1. A lightweight structural component comprising:
at least one metal panel;
at least one metal stiffening element;
the at least one metal stiffening element comprising two side pieces; and
each of the two side pieces being at least partially connected to the at least one metal panel in a material-locking manner,
wherein the two side pieces are connected to the at least one metal panel at two separate weld joint zones, and
wherein the at least one panel comprises a panel stiffening base having an outer portion and an inner portion arranged between inner surfaces of the two side pieces.

2. A lightweight structural component comprising:
at least one panel;
at least one stiffening element;
the at least one stiffening element comprising two side pieces;
each of the two side pieces being at least partially connected to the at least one panel in a material-locking manner;
the two side pieces being connected to the at least one panel at two separate joint zones; and
the at least one panel comprising a panel stiffening base having an outer portion and an inner portion arranged between inner surfaces of the two side pieces,
wherein the inner portion comprises a thickness $d_{HV}$ that is greater than a thickness $d_{HS}$ of the outer portion and wherein side surfaces of the inner portion rest against or adjacent to inner surfaces of the two side pieces.

3. The component of claim 2, wherein the two separate joint zones respectively extend at least partially up to the side surfaces of the inner portion.

4. A lightweight structural component comprising:
at least one panel;
at least one stiffening element;
the at least one stiffening element comprising two side pieces;
each of the two side pieces being at least partially connected to the at least one panel in a material-locking manner;

the two side pieces being connected to the at least one panel at two separate joint zones, wherein the at least one stiffening element comprises the following:

a ratio between a side piece thickness $t_s$ in a plane of each joint zone and a thickness $d_s$ of the at least one stiffening element comprises approximately $0.5 \leq t_s/d_s \leq$ approximately 1.8;

a ratio between each side piece length $s_s$ and a height $h_s$ of the at least one stiffening element comprises approximately $0.15 \leq s_s/h_s \leq$ approximately 0.7; and an angle $\beta$ between the panel and each joint surface of each joint zone comprises approximately $0° \leq \beta \leq$ approximately 250°.

5. The component of claim 4, wherein the at least one stiffening element further comprises the following:

a ratio of each side piece thickness $b_{s0}$ near a branching of the two side pieces and a side piece thickness $t_s$ in a plane of each joint zone comprises approximately $0.28 \leq b_{s0}/t_s \leq$ approximately 1.

6. A lightweight structural component comprising:

at least one panel;

at least one stiffening element;

the at least one stiffening element comprising two side pieces;

each of the two side pieces being at least partially connected to the at least one panel in a material-locking manner;

the two side pieces being connected to the at least one panel at two separate joint zones, wherein the two side pieces comprise tapered surfaces, whereby a thickness of the two side pieces near a bar portion of the at least one stiffening element is less than a thickness of the two side pieces near the two separate joint zones.

* * * * *